United States Patent
Isowaki et al.

(10) Patent No.: US 9,489,970 B2
(45) Date of Patent: Nov. 8, 2016

(54) MAGNETIC HEAD AND MAGNETIC RECORDING AND REPRODUCING APPARATUS

(71) Applicant: Kabushiki Kaisha Toshiba, Tokyo (JP)

(72) Inventors: Yousuke Isowaki, Kanagawa (JP);
Kenichiro Yamada, Tokyo (JP);
Masayuki Takagishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/927,549

(22) Filed: Oct. 30, 2015

(65) Prior Publication Data
US 2016/0071531 A1 Mar. 10, 2016

Related U.S. Application Data

(62) Division of application No. 14/638,762, filed on Mar. 4, 2015, now Pat. No. 9,208,804.

(30) Foreign Application Priority Data

May 16, 2014 (JP) .................................. 2014-102063

(51) Int. Cl.
*G11B 5/39* (2006.01)
(52) U.S. Cl.
CPC ............. *G11B 5/3912* (2013.01); *G11B 5/398* (2013.01); *G11B 5/3932* (2013.01)
(58) Field of Classification Search
None
See application file for complete search history.

(56) References Cited

U.S. PATENT DOCUMENTS

| 5,309,305 | A | 5/1994 | Nepela et al. | |
|---|---|---|---|---|
| 7,599,151 | B2 * | 10/2009 | Hatatani | B82Y 10/00 360/123.12 |
| 8,174,799 | B2 | 5/2012 | Hoshiya et al. | |
| 8,225,489 | B2 * | 7/2012 | Miyauchi | B82Y 25/00 216/62 |
| 8,451,567 | B2 * | 5/2013 | Zhou | G01R 33/098 29/603.14 |
| 8,749,926 | B1 * | 6/2014 | Le | G11B 5/3909 360/319 |
| 9,208,804 | B1 * | 12/2015 | Isowaki | G11B 5/3912 |
| 9,275,660 | B1 * | 3/2016 | Isowaki | G11B 5/3903 |

(Continued)

FOREIGN PATENT DOCUMENTS

| JP | 6-215334 | 8/1994 |
|---|---|---|
| JP | 2008-084430 | 4/2008 |

(Continued)

*Primary Examiner* — Will J Klimowicz
(74) *Attorney, Agent, or Firm* — Finnegan, Henderson, Farabow, Garrett & Dunner LLP

(57) ABSTRACT

A magnetic head of an embodiment includes a stack, side shields, and a first and a second magnetic shield. The stack includes a pin layer having a fixed magnetization direction, a first free layer having a magnetization direction to change in accordance with an external magnetic field, a second free layer antiferromagnetically exchange-coupled with the first free layer and having a magnetization direction to change in accordance with the field, and an antiferromagnetic layer exchange-coupled with the second free layer. A magnetic field is applied from the side shields to the first and second free layers, and a direction of the magnetic field is substantially parallel to the magnetization direction of one of the first and second free layers and substantially antiparallel to the magnetization direction of the other, and a magnetic volume of the one is larger than a magnetic volume of the other.

5 Claims, 16 Drawing Sheets

(56) References Cited

U.S. PATENT DOCUMENTS

| | | | | |
|---|---|---|---|---|
| 2003/0090844 A1* | 5/2003 | Shimizu | ............... | B82Y 10/00 360/324.12 |
| 2003/0123198 A1 | 7/2003 | Sugawara | | |
| 2003/0137782 A1* | 7/2003 | Ho | ............... | B82Y 10/00 360/324.2 |
| 2009/0135529 A1* | 5/2009 | Shimazawa | ............... | B82Y 10/00 360/319 |
| 2009/0262465 A1 | 10/2009 | Hatatani | | |
| 2010/0027168 A1* | 2/2010 | Chou | ............... | B82Y 25/00 360/319 |
| 2010/0039734 A1* | 2/2010 | Hara | ............... | B82Y 25/00 360/319 |
| 2010/0067148 A1* | 3/2010 | Tsuchiya | ............... | B82Y 25/00 360/245.3 |
| 2011/0051291 A1* | 3/2011 | Miyauchi | ............... | B82Y 10/00 360/245.3 |
| 2011/0181987 A1 | 7/2011 | Shiimoto | | |
| 2012/0087045 A1* | 4/2012 | Yanagisawa | ............... | B82Y 25/00 360/294 |
| 2012/0147504 A1* | 6/2012 | Zhou | ............... | G01R 33/098 360/324.12 |
| 2014/0252518 A1 | 9/2014 | Zhang | | |
| 2015/0116867 A1* | 4/2015 | Childress | ............... | G11B 5/3906 360/319 |

FOREIGN PATENT DOCUMENTS

| | | |
|---|---|---|
| JP | 2009-026400 | 2/2009 |
| JP | 2010-135039 | 6/2010 |
| WO | WO 2010/067730 A1 | 6/2010 |

* cited by examiner

MAGNETIC HEAD AND MAGNETIC RECORDING AND REPRODUCING APPARATUS

This is a division of application Ser. No. 14/638,762, filed Mar. 4, 2015, which is incorporated herein by reference.

CROSS REFERENCE TO RELATED APPLICATION

This application is based upon and claims the benefit of priority from Japanese Patent Application No. 2014-102063, filed on May 16, 2014; the entire contents of which are incorporated herein by reference.

FIELD

Embodiments described herein relate generally to a magnetic head and a magnetic recording and reproducing apparatus.

BACKGROUND

As a magnetic head (reproducing element head) of HDD (Hard Disk Drive) or the like, a magneto-resistance effect element is used. In the magnetic head of HDD, in order to reduce an influence of an external magnetic field, the magneto-resistance effect element is generally disposed between magnetic shields, and an interval between the magnetic shields regulates reproducing resolution.

In HDD, an improvement of the reproducing resolution is required in order to improve recording density. However, in a conventional magnetic head, it is structurally difficult to shorten the interval between the magnetic shields, which makes it difficult to improve the recording density.

DETAILED DESCRIPTION

A magnetic head of an embodiment includes a stack, a pair of side shields facing side surfaces of the stack, and a first and a second magnetic shield sandwiching the stack and the side shields.

The stack includes a pin layer disposed on the first magnetic shield and having a magnetization direction being fixed, an insulating layer disposed on the pin layer, a first free layer disposed on the insulating layer and having a magnetization direction configured to change in accordance with an external magnetic field, a second free layer disposed on the first free layer and antiferromagnetically exchange-coupled with the first free layer and having a magnetization direction configured to change in accordance with the external magnetic field, and an antiferromagnetic layer disposed on the second free layer and exchange-coupled with the second free layer.

A magnetic field is applied from the side shields to the first and second free layers, and a direction of the magnetic field is substantially parallel to the magnetization direction of one of the first and second free layers and is substantially antiparallel to the magnetization direction of the other of the first and second free layers. A magnetic volume of the one of the first and second free layers is larger than a magnetic volume of the other of the first and second free layers.

Hereinafter, embodiments will be described in detail with reference to the drawings.

First Embodiment

Figure 1A:
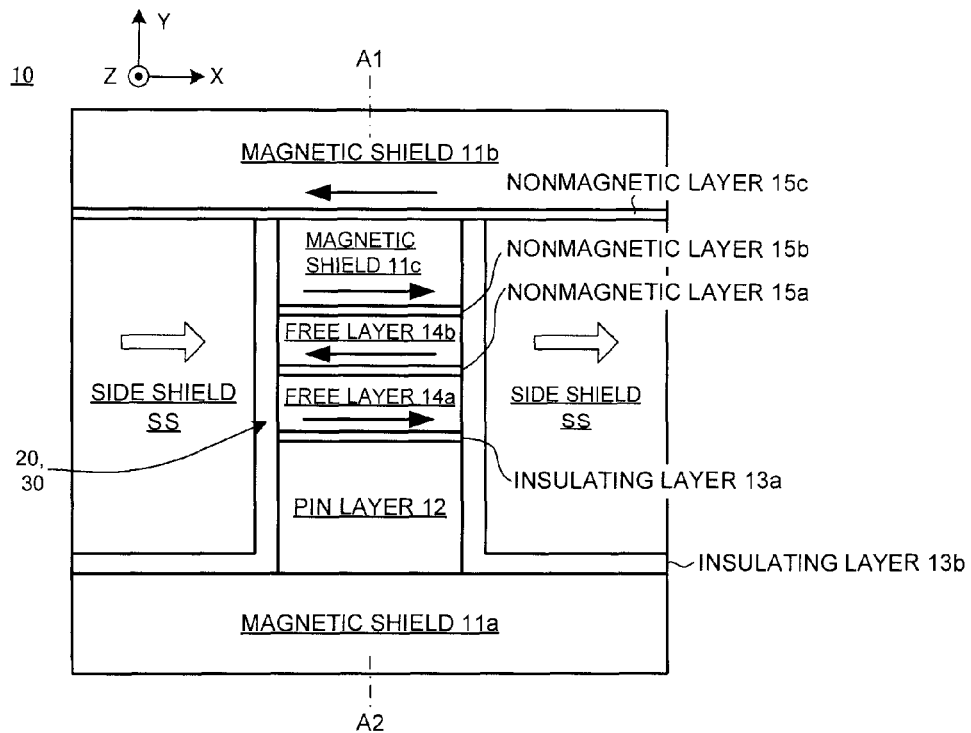
FIG. 1A and FIG. 1B are schematic views illustrating a magnetic head according to a first embodiment.
Figure 1B:
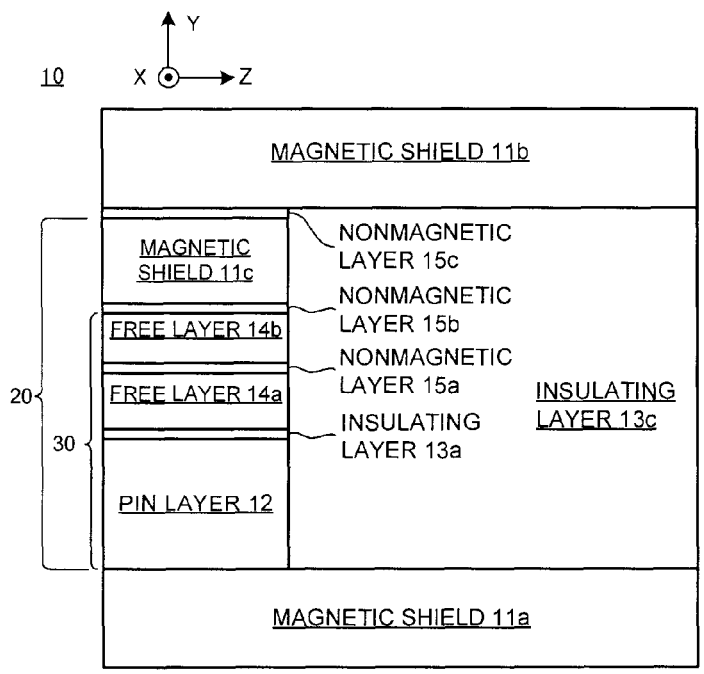

FIG. 1A and FIG. 1B are schematic views illustrating a magnetic head (reproducing element head of a differential output type) 10 according to a first embodiment. FIG. 1A is a plane view of the magnetic head 10. FIG. 1B is a cross-sectional view taken along A1-A2 line in FIG. 1A and illustrates the magnetic head 10 in a depth direction of the sheet in FIG. 1A.

Here, the drawings are schematic or conceptual, and a relation between thickness and width of each part, a size ratio among the parts, and so on are not necessarily the same as actual ones. Further, even when the same part is illustrated, its size and ratio are sometimes differently depicted in the drawings.

Note that, in the description of the present application and the drawings below, the same elements as those previously described in a drawing already referred to are denoted by the same reference sings, and a detailed description thereof will be omitted when appropriate.

The magnetic head 10 is mounted on, for example, a magnetic head (later-described magnetic head 93) of HDD (later-described magnetic recording and reproducing apparatus 90). The plane view in FIG. 1A is a schematic view seen from, for example, a direction perpendicular to a medium surface of a magnetic recording medium (later-described magnetic recording medium 91) mounted on the HDD. The cross-sectional view in FIG. 1B is a schematic view seen from, for example, a direction parallel to the medium surface of the magnetic recording medium.

As illustrated in FIG. 1A and FIG. 1B, the magnetic head 10 includes a magnetic shield 11a (first magnetic shield), a magnetic shield 11b (second magnetic shield), a pin layer 12, an insulating layer 13a, a free layer 14a (first free layer), a nonmagnetic layer 15a (second nonmagnetic layer), a free layer 14b (second free layer), a nonmagnetic layer 15b (nonmagnetic layer), a magnetic shield 11c (third magnetic shield), a nonmagnetic layer 15c, side shields SS, and insulating layers 13b, 13c. The arrows depicted in the magnetic shields 11b, 11c, the free layers 14a, 14b, and the side shields SS respectively indicate magnetization directions of the respective elements.

Here, if a direction from the magnetic shield 11a toward the magnetic shield 11b is defined as a Y-axis direction, the Y-axis direction is a film formation direction. A direction intersecting with the Y-axis direction, horizontal to film formation surfaces of the magnetic shields 11a, 11b, and directed toward the side shields SS is defined as an X-axis direction. A direction intersecting with the Y-axis direction and intersecting also with the X-axis direction is defined as a Z-axis direction.

In the magnetic head 10, the pin layer 12, the insulating layer 13a, the free layer 14a, the nonmagnetic layer 15a, the free layer 14b, the nonmagnetic layer 15b, and the magnetic shield 11c are substantially equal in dimensions in the X-axis direction and the Z-axis direction (have substantially the same rectangular shape) and form a stack 20.

Note that there is a possibility that the magnetic head 10 has a taper in the Y-axis direction, which is not illustrated, due to an influence of manufacturing processes (later-described etching step at Step S2 in FIG. 11). In this case, there is a possibility that a magnetic shield 11c side is slightly smaller than a pin layer 12 side in the dimensions in both the X-axis and Z-axis directions. That is, "substantially the same rectangular shape" can include the meaning that such a taper in the Y-axis direction is allowed.

In the stack 20, the pin layer 12, the insulating layer 13a, the free layer 14a, the nonmagnetic layer 15a, and the free layer 14b form a magneto-resistance effect element 30. The magneto-resistance effect element 30 outputs a signal due to a magneto-resistance effect between the free layer 14a and the pin layer 12. Note that the magneto-resistance effect element 30 is a magneto-resistance effect element of a differential output type that outputs a signal corresponding to a difference between changes that the magnetization directions of the free layers 14a, 14b undergo in response to a signal magnetic field.

Reproducing resolution of the magneto-resistance effect element 30 is regulated by an interval between the free layers 14a, 14b. That is, the resolution of the magneto-resistance effect element 30 is easily increased, as compared with a magneto-resistance effect element having a single free layer (later described magneto-resistance effect element 30x of a first comparative example).

The magnetic shields 11a, 11b, and 11c each have a shielding function of shielding the magneto-resistance effect element 30 from external magnetic fields other than a magnetic field (magnetic field from the magnetic recording medium) from immediately under the magneto-resistance effect element 30 (from the Z-axis direction). The magnetic shields 11a, 11b, and 11c shield the magneto-resistance effect element 30 especially from external magnetic fields applied to the magneto-resistance effect element 30 (free layers 14a, 14b) from Y-axis positive direction and negative direction.

The shielding function of the magnetic shield 11c need not be equal to those of the magnetic shields 11a, 11b, and may be weaker than these. That is, a shielding property of the magnetic shield 11c may be equal to or weaker than those of the magnetic shields 11a, 11b.

The magnetic shields 11a, 11b, and 11c each can be made of a magnetic material. As this magnetic material, any of NiFe, CoFe, CoZrTa, CoZrNb, CoZrNbTa, CoZrTaCr, and CoZrFeCr (hereinafter, referred to as "NiFe and so on") is usable, for instance. As the magnetic shields 11a, 11b, and 11c, multilayer films each containing any of NiFe and so on may be used.

Note that the magnetic shields 11a, 11b, and 11c may have different magnetic materials or different stacked structures.

A magnetization direction of the magnetic shields 11a, 11b is the X-axis direction when there is no applied magnetic field from the outside, that is, when they are in an initial state. In each of the magnetic shields 11a, 11b, an antiferromagnetic layer of Ir Mn or the like, for instance, may exist. Further, in each of the magnetic shields 11a, 11b, a layer of Ru, for instance, may be disposed to antiferromagnetically couple layers on both sides thereof.

A thickness of each of the magnetic shield 11a and the magnetic shield 11b, that is, a thickness in the Y-axis direction is 500 mm or more, for instance. This is intended to obtain a good shielding property.

The magnetic shield 11c may be thinner than the magnetic shields 11a, 11b. This is because the shielding function of the magnetic shield 11c may be weaker than those of the magnetic shields 11a, 11b. A thickness of the magnetic shield 11c (thickness in the Y-axis direction) is preferably not less than 1 nm nor more than 15 nm, and more preferably not less than 2 nm nor more than 6 nm. When the film thickness is within these ranges, the magnetic shield 11c has a good shielding property.

By observing a cross section of each part by TEM (transmission electron microscope), it is possible to measure the thickness of each part.

The magnetic shield 11c (third magnetic shield) is exchange-coupled (for example, antiferromagnetically exchange-coupled) with the free layer 14b via the nonmagnetic layer 15c and also is exchange-coupled (for example, antiferromagnetically exchange-coupled) with the magnetic shield 11b via the nonmagnetic layer 15c.

The exchange coupling means that a plurality of magnetic layers (magnetic bodies) are magnetically coupled via an interface of these or via an intermediate layer existing between these. These former and latter exchange couplings are direct and indirect magnetic couplings respectively. The exchange coupling is different from static magnetic field coupling caused by a leakage magnetic field from an end portion of the magnetic layer.

As this intermediate layer, either of a monolayer (for example, a nonmagnetic layer) and multilayers (for example, an alternate stack of a nonmagnetic layer and a magnetic layer) is usable. That is, magnetic coupling that is indirect coupling of a plurality magnetic layers via a nonmagnetic layer disposed therebetween is also a kind of the exchange coupling. When the coupling is via the nonmagnetic layer, the exchange coupling depends on a film thickness of the nonmagnetic layer and acts when the nonmagnetic layer has a very small thickness of 2 nm or less, for instance.

In the exchange coupling, it is thought that a ferromagnetic coupling bias magnetic field (or an antiferromagnetic coupling bias magnetic field) acts between the magnetic layers. For example, when there is no applied magnetic field bias or the like from the outside, the magnetization directions of the magnetic layers are aligned in the same direction (ferromagnetic coupling state) or aligned in opposite directions (antiferromagnetic coupling state) due to this action of the exchange coupling.

When there is an applied magnetic field bias or the like from the outside, this applied magnetic field bias or the like also acts on the magnetization in the magnetic layers. Specifically, the magnetization in the magnetic layers is directed in a direction decided by the synthesis of the applied magnetic field bias magnetic field from the outside and the bias magnetic field ascribable to the exchange coupling (a ferromagnetic coupling bias magnetic field component or an antiferromagnetic coupling magnetic field component). At this time, a direction of the bias magnetic field due to the exchange coupling does not necessarily agree with the direction of the magnetization between the magnetic layers.

The side shields SS have a shielding function of shielding the magneto-resistance effect element 30 from the external magnetic fields other than the magnetic field (magnetic field from the magnetic recording medium) from immediately under the magneto-resistance effect element 30 (from the Z-axis direction). The side shields SS shield the magneto-resistance effect element 30 especially from external magnetic fields applied to the magneto-resistance effect element 30 (the free layers 14a, 14b) from the X-axis positive direction and negative direction.

The pair of side shields SS are disposed to face both X-axis direction side surfaces of the stack 20 respectively. These side shields SS are disposed to face X-axis direction end surfaces of the free layers 14a, 14b. A magnetic field from the side shields SS is applied to the free layers 14a, 14b via the insulating layer 13b. As will be described later, the magnetic field from the side shields SS is one factor of unbalancing magnetization motion amounts of the free layers 14a, 14b.

The side shields SS each can be made of a magnetic material. As this magnetic material, any of NiFe and so on is usable, for instance, similarly to the magnetic shields 11a to 11c. As the side shields SS, multilayer films each containing any of NiFe and so on may be used.

The side shields SS are exchange-coupled with the magnetic shield 11b. In this embodiment, when the side shields SS are in an initial state, that is, when there is no applied magnetic field from the outside, their magnetization direction is directed in the X-axis positive direction.

However, the magnetization direction of the side shields SS in the initial state can also be the X-axis negative direction. For example, as will be described later, without the nonmagnetic layer 15c being disposed between the magnetic shield 11b and the side shields SS, the magnetization direction of the side shields SS in the initial state can be the X-axis negative direction.

Between the side shields SS and the magnetic shield 11a, and between the side shields SS and the stack 20, the insulating layer 13b is disposed. Further, between the magnetic shields 11a, 11b, the insulating layer 13c is disposed.

As the insulating layer 13b, an insulating material (for example, at least one of silicon oxide (for example, $SiO_2$), silicon nitride, silicon oxynitride, aluminum oxide (for example, $Al_2O_3$), aluminum nitride, and aluminum oxynitride) is usable.

As the insulating layer 13c, the same insulating material as that of the insulating layer 13b can also be used. However, the constituent materials of the insulating layers 13b, 13c may be different.

A film thickness of the insulating layer 13b is not less than 1 nm nor more than 4 nm, for instance. The insulating layer 13b makes it possible to pass a current only to the magneto-resistance effect element 30 without passing the current to the side shields SS, between the magnetic shields 11a, 11b. Consequently, it is possible to easily increase power of the magneto-resistance effect element 30. Note that the insulating layer 13c also contributes to the passage of the current only to the magneto-resistance effect element 30.

A magnetization direction of the pin layer 12 does not practically change and is fixed even when an external magnetic field is applied.

The pin layer 12 can be constituted by a film stack composed of a base layer, an antiferromagnetic layer, a plurality of ferromagnetic layers, and a plurality of nonmagnetic layers. Magnetization directions of the antiferromagnetic layer and the ferromagnetic layers included in the pin layer 12 are directed in the Z-axis direction.

As the base layer, Ta, Cr, NiCr, FeNi, Ta/NiCr, or the like is usable. A thickness of the base layer is not less than 1 nm nor more than 4 nm.

As the antiferromagnetic layer, IrMn, PtMn, or the like is usable. A film thickness (thickness in the Y-axis direction) of the antiferromagnetic layer is not less than 5 nm nor more than 20 nm, for instance.

As the ferromagnetic layers, CoFe, NiFe, CoFeB, or the like is usable. A film thickness of each of the ferromagnetic layers is not less than 1 nm nor more than 5 nm, for instance.

As the nonmagnetic layers, Ru, Cu, Ag, or the like is usable. A thickness of each of the nonmagnetic layers is not less than 0.3 nm nor more than 2 nm, for instance.

It is possible to form the pin layer 12 by stacking the base layer (NiCr (1 nm)), the antiferromagnetic layer (IrMn (8 nm)), the ferromagnetic layer (CoFe (2 nm)), the nonmagnetic layers (Ru (0.4 nm)), and the ferromagnetic layer (CoFe (2.5 nm)) in sequence, for instance.

As the insulating layer 13a, an insulating material (MgO, AlO (Al oxide), TiO (Ti oxide), or the like) is usable. A film thickness of the insulating layer 13a (length of the insulating layer 13a along the Y-axis direction) is preferably not less than 0.5 nm nor more than 2 nm. When the film thickness is within this range, it is possible to obtain a high magneto-resistance effect property from the magneto-resistance effect element 30.

As the nonmagnetic layers 15a, 15b, and 15c, Ru, Cu, Ag, or the like is usable.

A thickness of each of the nonmagnetic layers 15a, 15b, and 15c is not less than 0.3 nm nor more than 2 nm. When the film thickness of each of the nonmagnetic layers 15a, 15b, and 15c is within this range, it is possible to ferromagnetically or antiferromagnetically exchange-couple layers on both sides thereof.

In this embodiment, the free layers 14a, 14b are antiferromagnetically exchange-coupled via the nonmagnetic layer 15a. Further, the free layer 14b and the magnetic shield 11c are antiferromagnetically exchange-coupled via the nonmagnetic layer 15b. Further, the magnetic shield 11b is antiferromagnetically exchange-coupled with the magnetic shield 11c (and the side shields SS) via the nonmagnetic layer 15c.

In this embodiment, the magnetic shield 11b is antiferromagnetically exchange-coupled with the magnetic shield 11c and the side shields SS. Therefore, the magnetization direction of the magnetic shield 11b is opposite (substantially an opposite direction of) those of the magnetic shield 11c and the side shields SS.

Here, it is also possible to directly exchange-couple the magnetic shield 11b and the side shields SS without the nonmagnetic layer 15c being disposed therebetween. In this case, the magnetic shield 11b is ferromagnetically exchange-coupled with the side shields SS. At this time, the magnetization directions of the magnetic shield 11b and the side shields SS are substantially the same. That is, the magnetization direction of the side shields SS in the initial state is the X-axis negative direction.

The free layer 14a (first free layer) is disposed on the insulating layer 13a and its magnetization direction changes according to the external magnetic field.

The free layer 14b (second free layer) is antiferromagnetically exchange-coupled with the free layer 14a via the nonmagnetic layer 15a and its magnetization direction changes according to the external magnetic field.

As each of the free layers 14a, 14b, a magnetic material is used. As the magnetic material, CoFe, CoFeB, NiFe, CoFeMn, CoFeMnSi, CoFeMnGe, CoFeMnGeSi, or the like is usable, for instance. The free layers 14a, 14b need not be made of the same magnetic material and may be made of different magnetic materials. For example, the free layer 14a may be made of CoFeB and the free layer 14b may be made of CoFe.

A film thickness of each of the free layers 14a, 14b is not less than 2 nm nor more than 8 nm The thicknesses of the free layers 14a, 14b need not be equal and may be different.

In this embodiment, a magnetic volume (Ms×V (product of saturation magnetization and volume)) of the free layer 14a is preferably smaller than a magnetic volume of the free layer 14b. As will be described later, it is possible to suppress the unbalancing of the magnetization motion amounts (base lines shift (BLS)) of the free layers 14a, 14b in response to the external magnetic field (for example, the signal magnetic field from the magnetic recording medium in the HDD apparatus).

The magnetic volumes can be changed by the saturation magnetizations Ms of the magnetic materials forming the free layers 14a, 14b, or can be changed by the volumes V of the free layers 14a, 14b. The volumes V can be changed by the film thicknesses of the free layers 14a, 14b, for instance.

A difference between the magnetic volumes of the free layers 14a, 14b can be determined by combining, for example, shape observation by cross section TEM (transmission electron microscope), composition analysis by the cross section TEM and EDX (energy dispersion X-ray diffraction), and so on.

(Occurrence of Base-Line Shift and Suppression Thereof)

As previously described, due to the unbalancing of the magnetization motion amounts of the free layers 14a, 14b in response to the external magnetic field, the base-line shift (BLS) occurs. Hereinafter, the occurrence of the base-line shift (BLS) and the suppression thereof will be described in detail.

(1) Occurrence of Base-Line Shift

Figure 2:
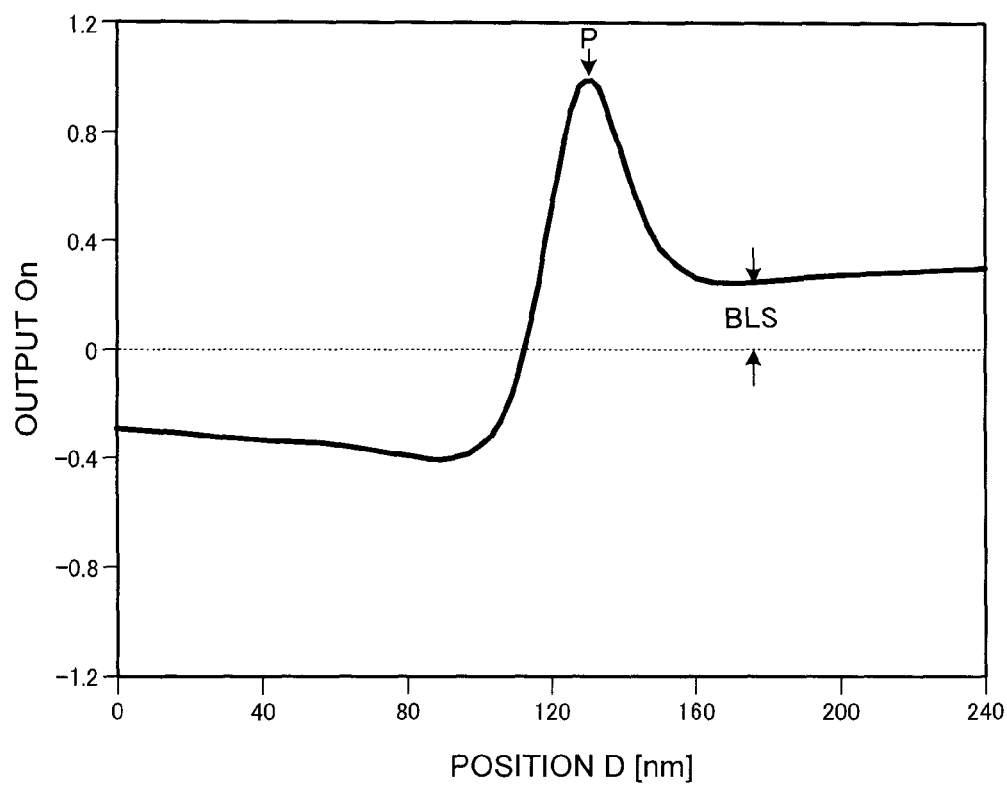
FIG. 2 is a graph illustrating an example of a base-line shift.

FIG. 2 is a graph illustrating an example of the base-line shift. The horizontal axis of the graph represents a relative position (running distance on the magnetic recording medium) D of the magnetic head 10 (magnetic reproducing head of the differential output type) with respect to the magnetic recording medium. Further, the vertical axis represents a normalized output On obtained by normalizing an output from the magnetic head 10. Note that here, the magnetic head 10 relatively moves in the Y-axis direction.

In accordance with a change of the position D, the output On rapidly increases and decreases (peak P) from a negative value, and thereafter becomes a positive value (base-line shift BLS). This peak P corresponds to a boundary of magnetization directions in the magnetic recording medium. Since the recording head 10 operates depending on a difference (disagreement) between the magnetization directions in the two free layers 14a, 14b, the boundary of the magnetization directions, that is, a change of a magnetized state (AC component in the magnetized state) is detected.

In other words, in the magnetic head 10, it is preferable that the output On becomes virtually zero in a region where the magnetized state is constant (DC magnetized state) on the magnetic recording medium. That is, in the magnetic head, it is expected that the output On becomes virtually zero before and after the peak P.

As described above, the base-line shift BLS is a phenomenon that, in the magnetic head 10, a signal is output in a predetermined magnetized state (DC magnetized state) where the output signal is not basically expected (should be zero). A magnitude of the base-line shift BLS is expressed by a difference from the zero output in the predetermined magnetized state.

(2) Cause of Base-Line Shift.

The base-line shift is thought to be caused by a different between the magnetization motion amounts of the free layers 14a, 14b in response to the same external magnetic field (unbalancing of the magnetization motion amounts).

In this embodiment, as the cause of this unbalancing, the following two can be thought. Specifically, they are: a) an operation by a leakage magnetic field (bias magnetic field) applied to the free layers 14a, 14b from the side shields SS; and b) an interaction of the magnetic shield 11c and the free layer 14b. As will be described later, in this embodiment, b) the influence by the magnetic shield 11c is large.

a) Unbalancing Due to the Side Shields SS

The magnetization motion amounts are unbalanced as follows due to the side shields SS. Specifically, since the free layers 14a, 14b are antiferromagnetically coupled and thus their magnetization directions are different (opposite), they are differently influenced by the leakage magnetic field from the side shields SS. When the magnetization directions of the free layers 14a, 14b are the same as the direction of the leakage magnetic field from the side shields SS, the magnetization directions are difficult to move, and when they are opposite, the magnetization directions easily move.

In this embodiment, the free layer 14a tends to be difficult to move and the free layer 14b tends to easily move. This is because the magnetization direction of the free layer 14a is the same as (substantially parallel to) the direction of the leakage magnetic field from the side shields SS, and the magnetization direction of the free layer 14b is opposite (substantially antiparallel to) the direction of the leakage magnetic field from the side shields SS.

b) Unbalancing Due to the Magnetic Shield 11c

Due to the magnetic shield 11c, the motion amounts become unbalanced as follows. This is because spatial dispositions when the free layer 14b is seen from the magnetic shield 11c and when the free layer 14a is seen from the magnetic shield 11a are deviated. Specifically, a distance between the free layer 14b and the magnetic shield 11c is smaller than a distance between the free layer 14a and the magnetic shield 11a. Accordingly, due to the shielding effect of the magnetic shield 11c, intensity of the external magnetic field entering the free layer 14b becomes smaller than intensity of the external magnetic field entering the free layer 14a. As a result, the free layer 14a can more easily move than the free layer 14b, resulting in the occurrence of the unbalancing.

c) Magnitudes of the Operations of the Side Shields SS and the Magnetic Shield 11c As described above, the influence of the side shields SS on the unbalancing of the motion amounts of the free layers 14a, 14b is opposite the influence of the magnetic shield 11c thereon.

However, in this embodiment, the distance between the magnetic shield 11c and the free layer 14b is smaller than the distance between the side shields SS and the free layers 14a, 14b. Consequently, the influence of the magnetic shield 11c is larger than the influence of the side shields SS. As a result, when the magnetic volumes of the free layers 14a, 14b are equal, the motion amount of the free layer 14b becomes smaller than the motion amount of the free layer 14a.

In this embodiment, the magnetization direction of the free layer 14a is the same as the direction of the leakage magnetic field from the side shields SS, and the magnetization direction of the free layer 14b is opposite the direction of the leakage magnetic field from the side shields SS.

On the other hand, it is also possible for the magnetization direction of the side shields SS in the initial state to be the X-axis negative direction as previously described, and in this case, the relations between the magnetization directions of the free layers 14a, 14b and the direction of the leakage magnetic field from the side shield SS are reversed. That is, in this case, the magnetization direction of the free layer 14a is opposite the direction of the leakage magnetic field from the side shields SS, and the magnetization direction of the free layer 14b is the same as the direction of the leakage magnetic field from the side shields SS.

Even when the direction relations are reversed, if the magnetic volumes of the free layers 14a, 14b are equal, the motion amount of the free layer 14b becomes smaller than the motion amount of the free layer 14a. In this case, the influence of the side shields SS on the unbalancing of the motion amounts of the free layers 14a, 14b is the same as the influence of the magnetic shield 11c thereon. Incidentally, since the influence of the magnetic shield 11c is larger than the influence of the side shields SS, a change of the magnetization direction of the side shields SS does not matter very much.

(3) Suppression of Base-Line Shift

In this embodiment, the magnetic volume of the free layer 14a is made smaller than the magnetic volume of the free layer 14b. That is, intensity of the antiferromagnetic coupling magnetic field applied to the free layer 14a via the nonmagnetic layer 15a is made larger than intensity of the antiferromagnetic coupling magnetic field applied to the free layer 14b. Consequently, it is possible to make the free layer 14a more difficult to move than the free layer 14b, which makes it possible to solve the unbalancing of the magnetization motion amounts of the free layers 14a, 14b to suppress the base-line shift. As a result, a high SNR (Signal Noise Ratio) is obtained, enabling an increase of recording density.

First Comparative Example

Figure 3A:
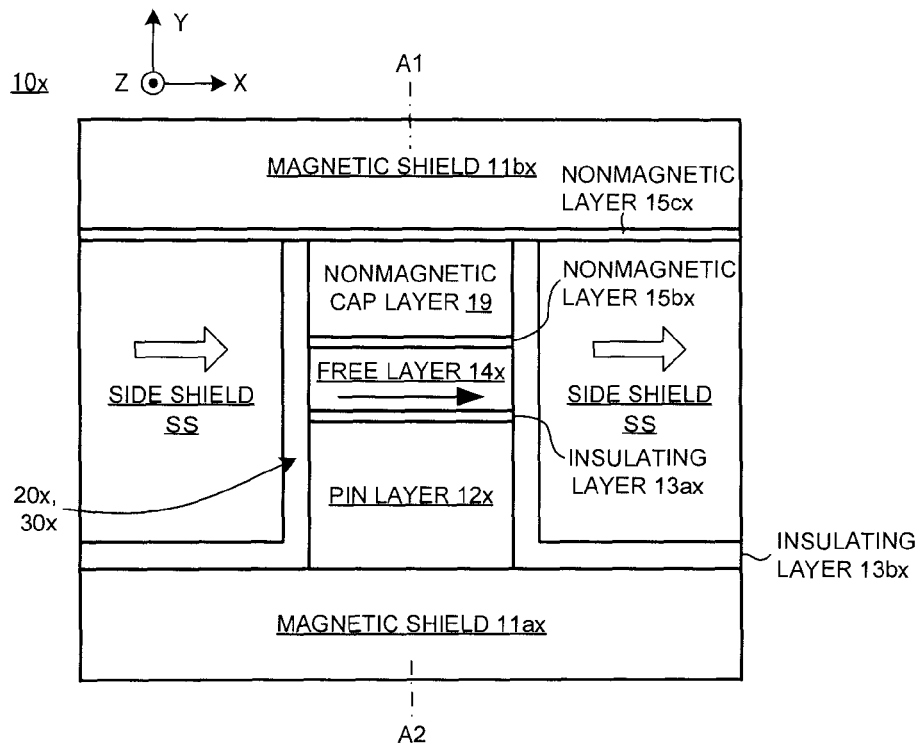
FIG. 3A and FIG. 3B are schematic views illustrating a magnetic head according to a first comparative example.
Figure 3B:
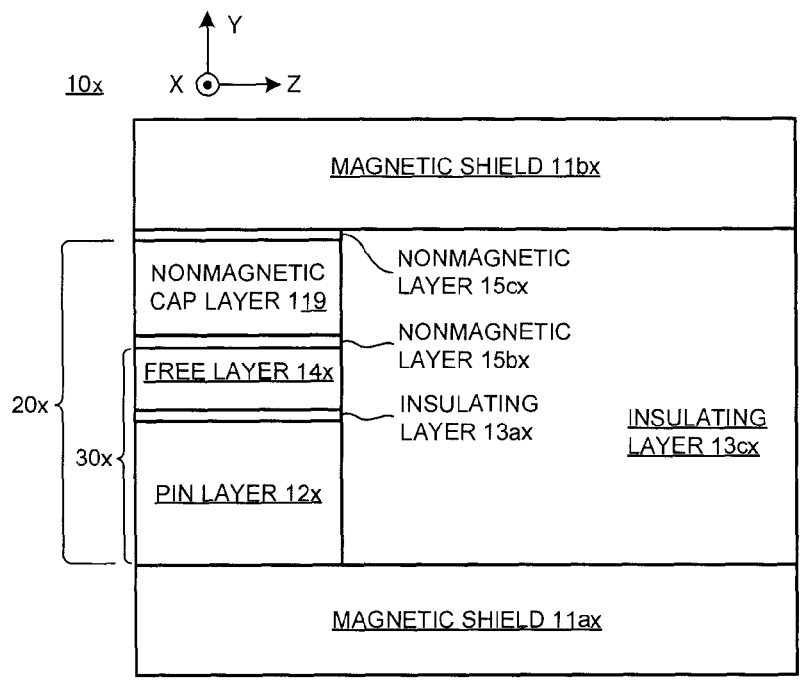

FIG. 3A and FIG. 3B are schematic views illustrating a magnetic head 10x according to the first comparative example. As illustrated in FIG. 3A and FIG. 3B, the magnetic head 10x includes magnetic shields 11ax, 11bx, a pin layer 12x, an insulating layer 13ax, a free layer 14x, a nonmagnetic layer 15bx, a nonmagnetic cap layer 19, a nonmagnetic layer 15cx, side shields SS, and insulating layers 13bx, 13cx.

In the magnetic head 10x, the pin layer 12x, the insulating layer 13ax, the free layer 14x, the nonmagnetic layer 15bx, and the nonmagnetic cap layer 19 are substantially equal in dimensions in an X-axis direction and a Z-axis direction (have substantially the same rectangular shape) and form a stack 20x. Note that "substantially the same rectangular shape" can include the meaning that a taper in a Y-axis direction is allowed, as in the first embodiment.

In the stack 20x, the pin layer 12x, the insulating layer 13ax, and the free layer 14x form the magneto-resistance effect element 30x.

Since the magnetic head 10x has the single free layer 14x, it is a magnetic head of the magneto-resistance effect element 30x of a non-differential type (TMR (Tunnel Magneto-Resistance Effect) type), and is susceptible to an influence of external noise. Therefore, in order to increase resolution of the magnetic head 10x, it is necessary to narrow an interval between the magnetic shields 11ax, 11bx. However, since the magneto-resistance effect element 30x, the nonmagnetic cap layer 19, and so on exist between the magnetic shields 11ax, 1bx, there is a limit to reducing the interval (narrowing a gap) between the magnetic shields 11ax, 11bx.

On the other hand, in the first embodiment, since the resolution of the magnetic head 10 (magneto-resistance effect element 30) is regulated by the distance between the free layers 14a, 14b, higher resolution is easily achieved. The interval between the free layers 14a, 14b is sufficiently narrow, as compared with the interval between the magnetic shields 11ax, 11bx in the magnetic head 10x of the first comparative example. For example, the interval between the free layers 14a, 14b is 1 nm. On the other hand, the interval between the magnetic shields 11ax, 11bx of the magnetic head 10x is about 25 nm, for instance.

Further, in the first embodiment, since it is possible to balance the magnetization motion amounts of the free layers 14a, 14b in response to the magnetic field, it is possible to suppress the base-line shift. As a result, a high SNR can be ensured, which facilitates high-density recording.

Second Comparative Example

Figure 4A:
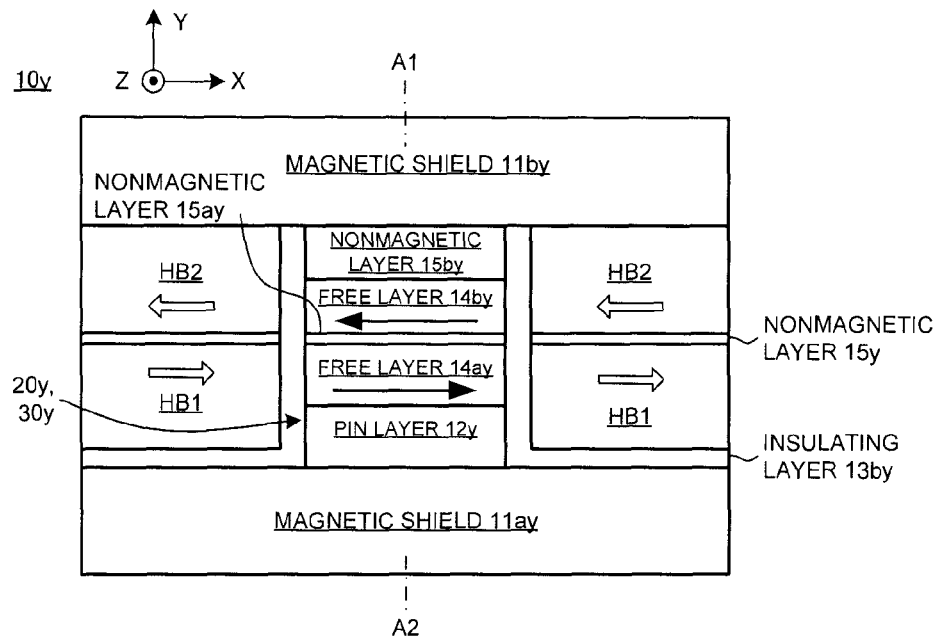
FIG. 4A and FIG. 4B are schematic views illustrating a magnetic head according to a second comparative example.
Figure 4B:
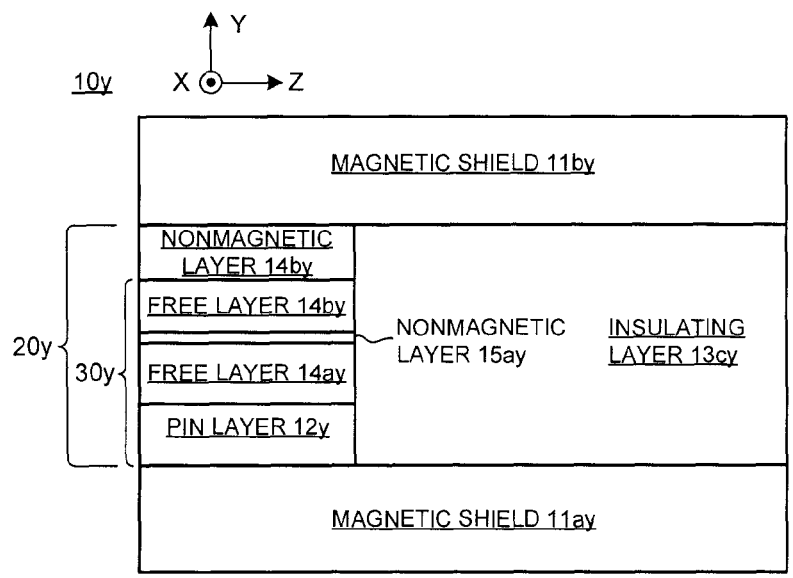

FIG. 4A and FIG. 4B are schematic views illustrating a magnetic head 10y according to a second comparative example. As illustrated in FIG. 4A and FIG. 4B, the magnetic head 10y includes magnetic shields 11ay, 11by, a pin layer 12y, a free layer 14ay, a nonmagnetic layer 15ay, a free layer 14by, a nonmagnetic layer 15by, hard biases HB1, HB2, a nonmagnetic layer 15y, and insulating layers 13by, 13cy.

In the magnetic head 10y, the pin layer 12y, the free layer 14ay, the nonmagnetic layer 15ay, the free layer 14by, and the nonmagnetic layer 15by are substantially equal in dimensions in an X-axis direction and a Z-axis direction (have substantially the same rectangular shape) and form a stack 20y. Note that "substantially the same rectangular shape" can include the meaning that a taper in a Y-axis direction is allowed, as in the first embodiment.

In the stack 20y, the pin layer 12y, the free layer 14ay, the nonmagnetic layer 15ay, and the free layer 14by form a magneto-resistance effect element 30y The magnetic head 10y is of a differential output type having the two free layers 14ay, 14by, similarly to the magnetic head 10 of the first embodiment.

The magnetic head 10y has the hard biases HB1, HB2 disposed in correspondence to the free layers 14ay, 14by respectively. Further, the free layers 14ay, 14by are disposed symmetrically between the magnetic shields 11ay, 11by. Therefore, in the magnetic head 10y, unbalancing of magnetization motion amounts of the free layers 14ay, 14by, that is, a base-line shift is theoretically suppressed.

However, in the magnetic head 10y, especially the manufacture of the hard biases HB1, HB2 is not easy, as compared with the magnetic head 10 of the first embodiment. That is, it is difficult to arrange the hard biases HB1, HB2 in the Y-axis direction in correspondence to the free layers 14ay, 14by.

In the magnetic head 10y, even slight deviation in position and width in the Y-axis direction of the hard biases HB1, HB2 breaks the correspondence relation with the free layers 14ay, 14by, leading to the unbalancing of the magnetization motion amounts of the free layers 14ay, 14by. Thus, in consideration of variation in the manufacture, it is not necessarily easy to suppress the base-line shift in the magnetic head 10y.

In the second comparative example, it can be also thought that the hard biases HB2 are not used. However, in this case as well, the free layer 14ay and the hard biases HB1 have to be disposed so as to be aligned in the Y-axis direction, and the manufacture is not easy. Further, it is not necessarily easy to suppress the base-line shift ascribable to variation in the manufacture.

On the other hand, in the magnetic head 10 according to the first embodiment, since the side shields SS are not divided unlike the hard biases HB1, HB2 of the second comparative example, the manufacture is relatively easy. The necessity to arrange the free layer 14ay and the hard biases HB1 in alignment in the Y-axis direction as in the second comparative example is reduced.

Further, by adjusting magnetic volumes (for example, thicknesses in the Y-axis direction) of the free layers 14a, 14b, it is possible to balance the magnetization motion amounts of the free layers 14a, 14b to relatively easily suppress the base-line shift. As a result, a high SNR can be ensured, which facilitates a high-density recording.

Second Embodiment

Figure 5A:
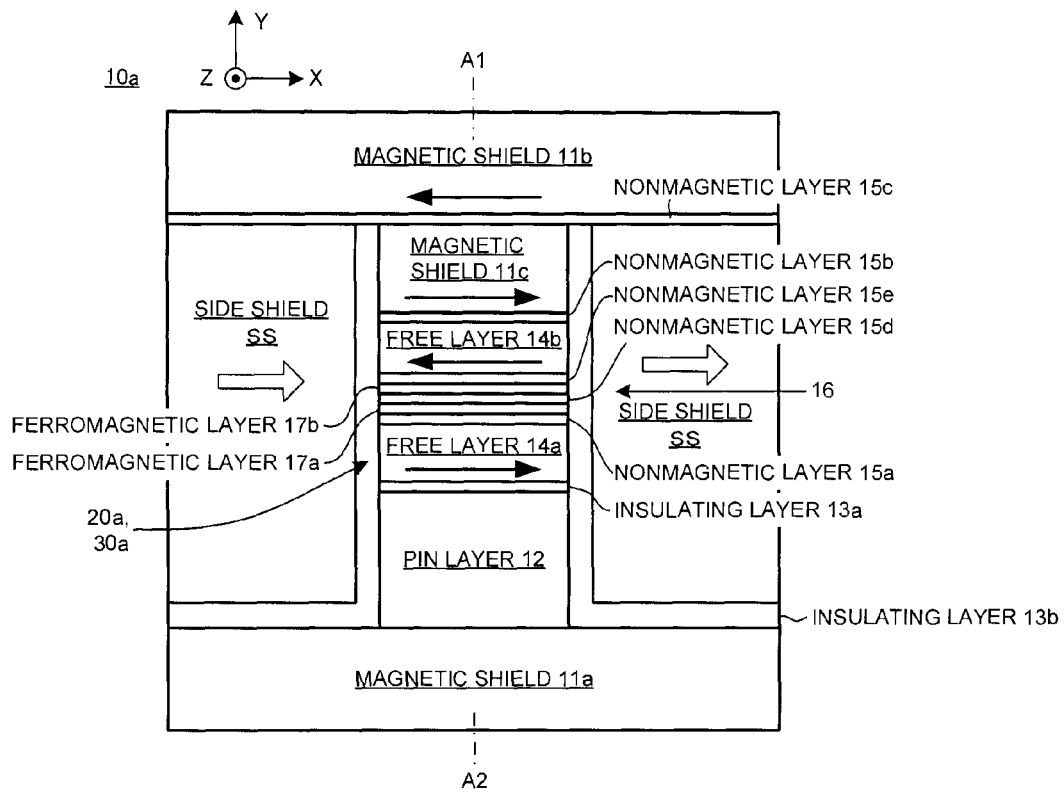
FIG. 5A and FIG. 5B are schematic views illustrating a magnetic head according to a second embodiment.
Figure 5B:
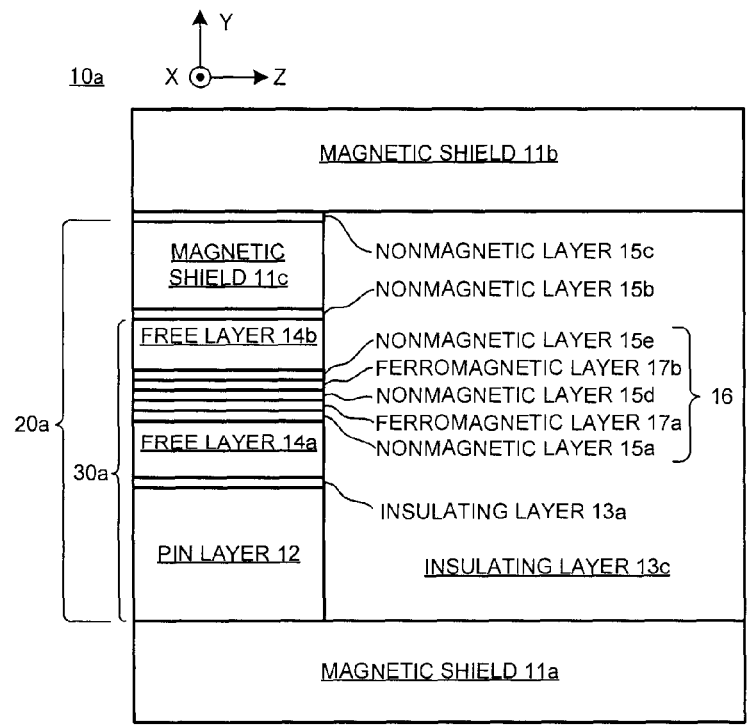

FIG. 5A and FIG. 5B are schematic views illustrating a magnetic head 10a according to a second embodiment. FIG. 5A is a plane view of the magnetic head 10a. FIG. 5B is a cross-sectional view taken along A1-A2 line in FIG. 5A and illustrates the magnetic head 10a in a depth direction of the sheet in FIG. 5A.

As illustrated in FIG. 5A and FIG. 5B, the magnetic head 10 includes magnetic shields 11a, 11b, a pin layer 12, an insulating layer 13a, a free layer 14a, a gap adjusting layer 16, a free layer 14b, a nonmagnetic layer 15b, a magnetic shield 11c, a nonmagnetic layer 15c, side shields SS, and insulating layers 13b, 13c.

In the magnetic head 10a, as compared with the magnetic head 10, the gap adjusting layer 16 is disposed instead of the nonmagnetic layer 15a. A stack 20a and a magneto-resistance effect element 30a of the magnetic head 10a are also the same in this point.

The gap adjusting layer 16 is inserted between the free layers 14a, 14b and is formed by alternately stacking a plurality of nonmagnetic layers 15 and a plurality of ferromagnetic layers 17 [nonmagnetic layers 15 (n)/ferromagnetic layers 17 (n−1)] (n: the number of the stacking). In FIG. 5A and FIG. 5B, the number of the stacking n=3, and the nonmagnetic layers 15(1), 15(3), 15(5) are illustrated as nonmagnetic layers 15a, 15d, 15e, and the ferromagnetic layers 17(2), 17(4) are illustrated as ferromagnetic layers 17a, 17b.

In this embodiment, by the gap adjusting layer 16, an interval between the free layer 14a, 14b is adjusted, which makes it possible to adjust resolution for an intended recording density.

The ferromagnetic layers 17 of the gap adjusting layer 16 are antiferromagnetically exchange-coupled via the nonmagnetic layer 15. The free layers 14a, 14b are also antiferromagnetically exchange-coupled via the gap adjusting layer 16. That is, in the gap adjusting layer 16, the ferromagnetic layer 17 is stacked an even number of times, and the nonmagnetic layer 15 is stacked an odd number of times.

As the nonmagnetic layers 15 (in FIG. 5A and FIG. 5B, the nonmagnetic layer 15d and the nonmagnetic layer 15e) (here, the nonmagnetic layer 15a is excluded) of the gap adjusting layer 16, Ru or Cu is used, for instance. A film thickness of each of the nonmagnetic layers 15 (here, the nonmagnetic layer 15a is excluded) of the gap adjusting layer 16 is not less than 0.2 nm nor more than 2 nm, for instance.

As the ferromagnetic layers 17 of the gap adjusting layer 16, CoFe, CoFeB, NiFe, or the like is usable, for instance. A film thickness of each of the ferromagnetic layers 17 is not less than 0.5 nm nor more than 2 nm, for instance.

When the nonmagnetic layers 15 and the ferromagnetic layers 17 of the gap adjusting layer 16 are within these material and film thickness ranges, it is possible to strongly antiferromagnetically exchange-couple the magnetizations between the ferromagnetic layers 17 of the gap adjusting layer 16, and between the free layers 14a, 14b.

The gap adjusting layer 16 is [Ru (0.4 nm)/CoFe (1 nm)/Ru (0.4 nm)/CoFe (1 nm)/Ru (0.4 nm)], for instance.

Since constituent materials and film thicknesses of the magnetic shields 11a, 11b, 11c, the pin layer 12, the insulating layer 13a, the free layer 14a, the nonmagnetic layer 15a, the free layer 14b, the nonmagnetic layer 15b, the nonmagnetic layer 15c, the side shields SS, and the insulating layers 13b, 13c which are illustrated in FIG. 5A and FIG. 5B are the same as those in FIG. 1A and FIG. 1B, a description thereof will be omitted.

Causes of the occurrence of a base-line shift in this embodiment are the same as those in the first embodiment. That is, a) an operation of the magnetic shield 11c, and b) an operation of the side shields SS are the causes of the occurrence of the base-line shift, but b) the influence by the magnetic shield 11c is larger.

As a result, in this embodiment as well, a magnetic volume of the free layer 14a is preferably smaller than a magnetic volume of the free layer 14b as in the first embodiment. That is, intensity of an antiferromagnetic coupling magnetic field applied to the free layer 14a via the nonmagnetic layer 15a is made larger than intensity of an antiferromagnetic coupling magnetic field applied to the free layer 14b. Consequently, it is possible to make the free layer 14a more difficult to move than the free layer 14b, which makes it possible to solve the unbalancing of magnetization motion amounts of the free layers 14a, 14b to suppress the base-line shift. As a result, a high SNR is obtained, enabling an increase of recording density.

As described above, in the second embodiment, the gap adjusting layer 16 is inserted between the free layer 14a and the free layer 14b, as compared with the first embodiment. Consequently, the interval between the free layers 14a, 14b becomes larger than that in the first embodiment, but as compared with the interval, for example, about 25 nm, between the magnetic shields 11ax, 11bx of the magnetic head 10x of the first comparative example, sufficiently high resolution is obtained. For example, in the structure in FIG. 5A and FIG. 5B, the interval between the free layers 14a, 14b is 3.2 nm, for instance. Further, in the second embodiment, it is possible to adjust resolution for an intended recording density.

Third Embodiment

Figure 6A:
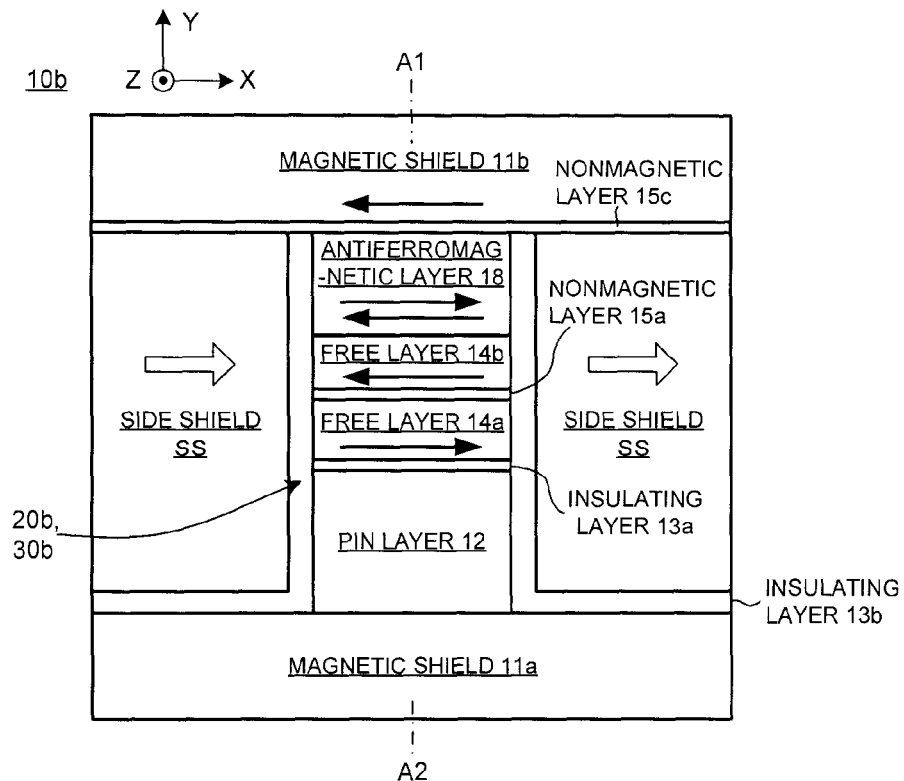
FIG. 6A and FIG. 6B are schematic views illustrating a magnetic head according to a third embodiment.
Figure 6B:
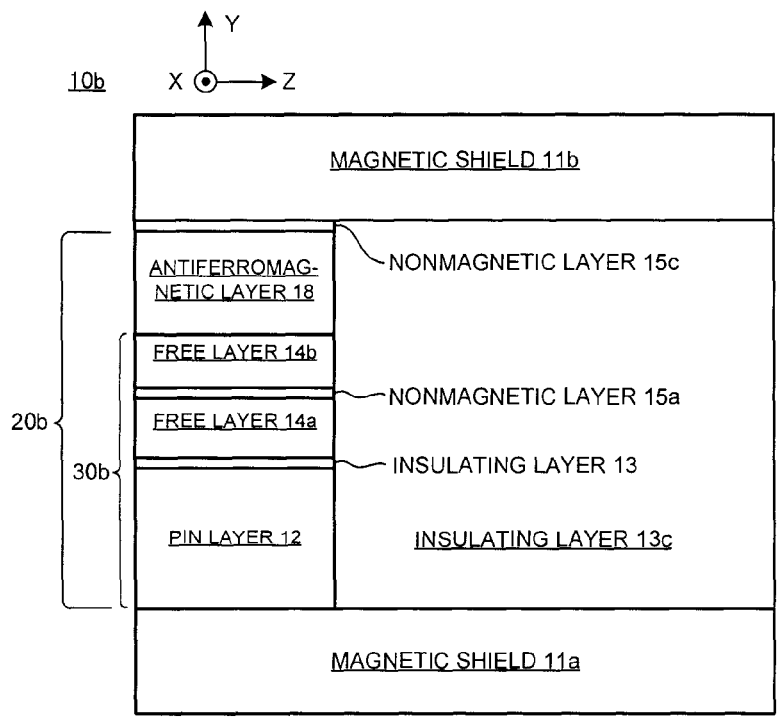

FIG. 6A and FIG. 6B are schematic views illustrating a magnetic head 10b according to a third embodiment. FIG. 6A is a plane view of the magnetic head 10b. FIG. 6B is a cross-sectional view taken along A1-A2 line in FIG. 6A and illustrates the magnetic head 10b in a depth direction of the sheet in FIG. 6A.

As illustrated in FIG. 6A and FIG. 6B, the magnetic head 10b includes magnetic shields 11a, 11b, a pin layer 12, an insulating layer 13a, a free layer 14a, a nonmagnetic layer 15a, a free layer 14b, an antiferromagnetic layer 18, a nonmagnetic layer 15c, side shields SS, and insulating layers 13b, 13c.

In the magnetic head 10b, as compared with the magnetic head 10, the antiferromagnetic layer 18 is disposed instead of the nonmagnetic layer 15b and the magnetic shield 11c. A stack 20b and a magneto-resistance effect element 30b of the magnetic head 10b are also the same in this point.

A magnetization direction of the antiferromagnetic layer 18 is an X-axis direction (width direction of the stack 20), and the antiferromagnetic layer 18 is exchange-coupled (for example, antiferromagnetically exchange-coupled) with the free layer 14b.

As the antiferromagnetic layer 18, an antiferromagnetic material such as IrMn or PtMn is usable.

A film thickness of the antiferromagnetic layer 18 is about equal to that of the pin layer 12, and is not less than 5 nm nor more than 15 nm, for instance. When the film thickness of the antiferromagnetic layer 18 is within this range, it becomes easy to symmetrically dispose the free layers 14a, 14b between the magnetic shields 11a, 11b (substantially align a boundary of the free layers 14a, 14b with a center of an interval between the magnetic shields 11a, 11b). As a result, it is possible to suppress the unbalancing of magnetization motion amounts of the free layers 14a, 14b ascribable to the magnetic shields 11a, 11b.

In this embodiment, since constituent materials and film thicknesses of the magnetic shields 11a, 11b, the pin layer 12, the insulating layer 13a, the free layer 14a, the nonmagnetic layer 15a, the free layer 14b, the nonmagnetic layer 15c, the side shields SS, and the insulating layers 13b, 13c are substantially the same as those in the first embodiment, a description thereof will be omitted.

However, magnetic volumes of the free layer 14a and the free layer 14b are different from those in the first embodiment, as will be described later.

Causes of the occurrence of a base-line shift and its suppression principle in this embodiment are different from those in the first and second embodiments. Specifically, in this embodiment, an operation of the side shields SS is the cause of the occurrence of the base-line shift.

In this embodiment, a magnetization direction of the side shields SS in an initial state is an X-axis positive direction. Therefore, in this embodiment, the magnetic volume of the free layer 14a is preferably larger than the magnetic volume of the free layer 14b, unlike the first and second embodiments. That is, intensity of an antiferromagnetic coupling magnetic field applied to the free layer 14a via the nonmagnetic layer 15a is made smaller than intensity of an antiferromagnetic coupling magnetic field applied to the free layer 14b. Consequently, it is possible to make the free layer 14a more easily move than the free layer 14b, which makes it possible to solve the unbalancing of the magnetization motion amounts of the free layers 14a, 14b to suppress the base-line shift. As a result, a high SNR is obtained, enabling an increase of recording density.

As previously described, it is also possible for the magnetization direction of the side shields SS in the initial state to be an X-axis negative direction. In this case, the magnetic volume of the free layer 14a is preferably smaller than the magnetic volume of the free layer 14b, as in the first and second embodiments.

As described above, when the direction of the magnetic field from the side shields SS is substantially parallel to the magnetization direction of one of the free layers 14a, 14b (substantially antiparallel to the magnetization direction of the other), the magnetic volume of this one of them is preferably larger than the magnetic volume of the other.

Note that, in the third embodiment, reproducing resolution is easily improved, as compared with the magnetic head 10x of the first comparative example.

Fourth Embodiment

Figure 7A:
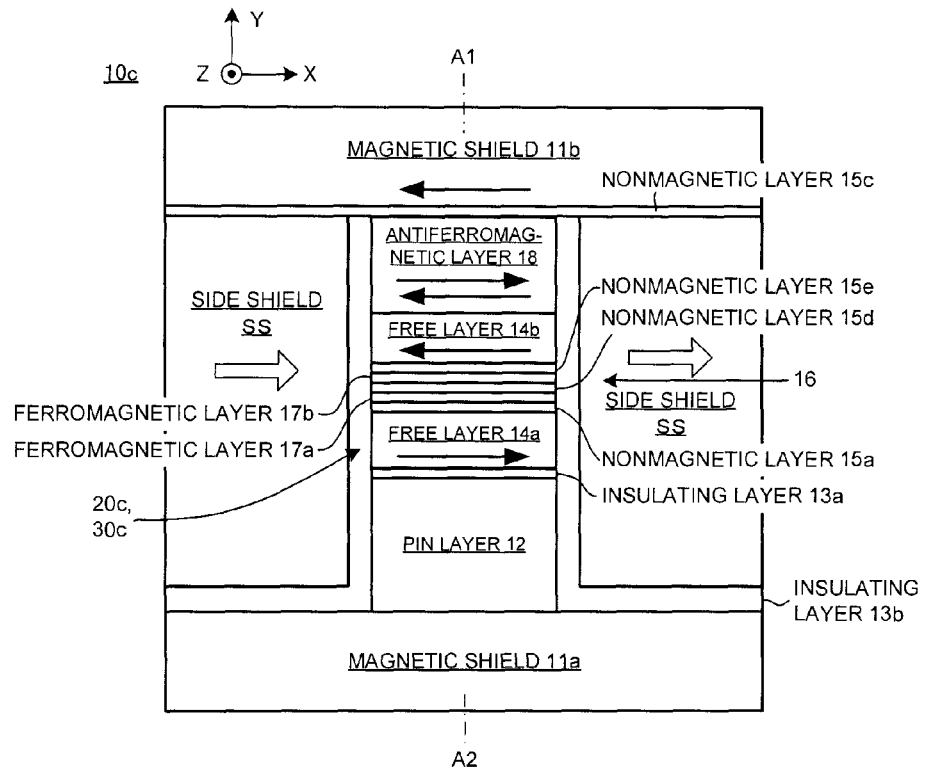
FIG. 7A and FIG. 7B are schematic views illustrating a magnetic head according to a fourth embodiment.
Figure 7B:
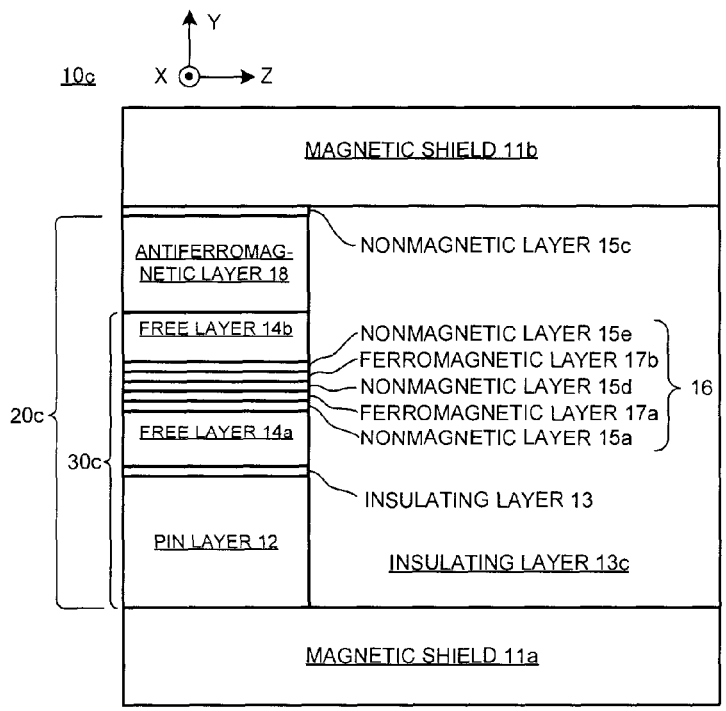

FIG. 7A and FIG. 7B are schematic views illustrating a magnetic head 10c according to a fourth embodiment. FIG. 7A is a plane view of the magnetic head 10c. FIG. 7B is a cross-sectional view taken along A1-A2 line in FIG. 7A and illustrates the magnetic head 10c in a depth direction of the sheet in FIG. 7A.

As illustrated in FIG. 7A and FIG. 7B, the magnetic head 10c includes magnetic shields 11a, 11b, a pin layer 12, an insulating layer 13a, a free layer 14a, a gap adjusting layer 16, a free layer 14b, an antiferromagnetic layer 18, a nonmagnetic layer 15c, side shields SS, and insulating layers 13b, 13c.

In the magnetic head 10c, as compared with the magnetic head 10b, the gap adjusting layer 16 is disposed instead of the nonmagnetic layer 15a. A stack 20c and a magneto-resistance effect element 30c of the magnetic head 10c are also the same in this point.

As material conditions (material, film thickness, shape) used in the fourth embodiment, the same ones as those of the first, second, and third embodiments are usable.

A cause of the occurrence of a base-line shift in this embodiment is also ascribable to the side shields SS as in the third embodiment, and therefore, in this embodiment as well, when a direction of a magnetic field from the side shields SS is substantially parallel to a magnetization direction of one of the free layers 14a, 14b (substantially antiparallel to a magnetization direction of the other), a magnetic volume of this one of these is preferably larger than a magnetic volume of the other, as in the third embodiment. Consequently, it is possible to make the free layer 14a more difficult to move than the free layer 14b, which makes it possible to solve the unbalancing of magnetization motion amounts of the free layers 14a, 14b to suppress the base-line shift. As a result, a high SNR is obtained, enabling an increase of recording density.

As described above, in the fourth embodiment, it is possible to adjust resolution for an intended recording density. Further, the suppression of the base-line shift and an increase of resolution are easy, and a high SNR can be obtained, which facilitates an increase of recording density.

As described above, in the fourth embodiment, the gap adjusting layer 16 is inserted between the free layer 14a and the free layer 14b, as compared with the third embodiment. Consequently, an interval between the free layers 14a, 14b becomes larger than that in the third embodiment, but as compared with the magnetic shields 11ax, 11bx of the magnetic head 10x of the first comparative example, sufficiently high resolution is obtained. Further, in the fourth embodiment, it is possible to adjust resolution for an intended recording density.

Fifth Embodiment

Figure 8A:
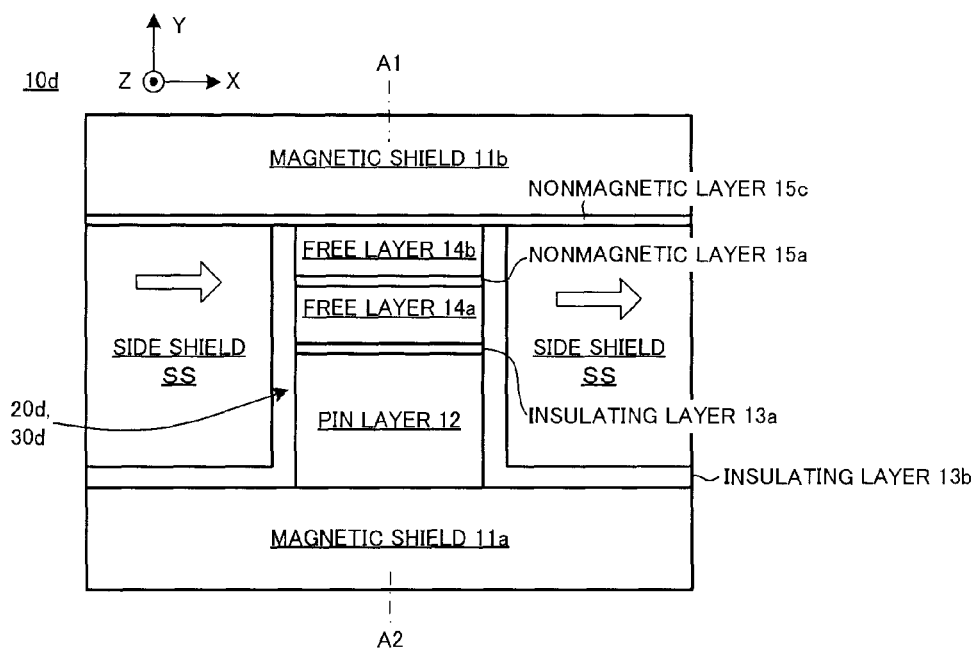
FIG. 8A and FIG. 8B are schematic views illustrating a magnetic head according to a fifth embodiment.
Figure 8B:
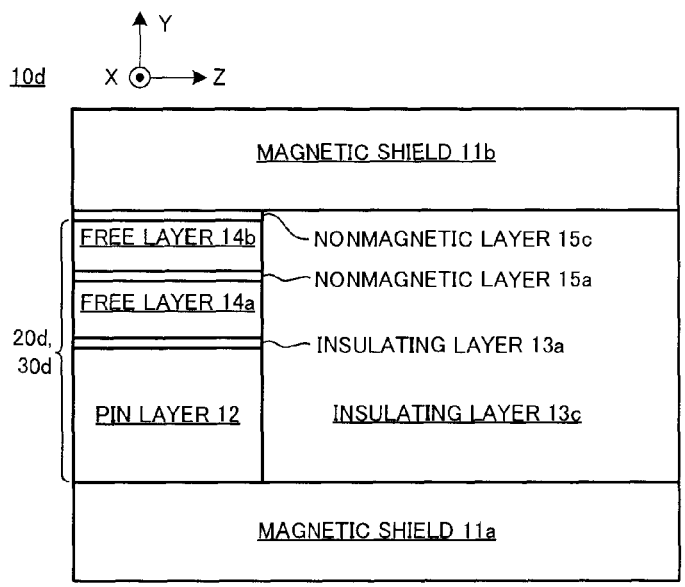

FIG. 8A and FIG. 8B are schematic views illustrating a magnetic head 10d according to a fifth embodiment. FIG. 8A is a plane view of the magnetic head 10d. FIG. 8B is a cross-sectional view taken along A1-A2 line in FIG. 8A and illustrates the magnetic head 10d in a depth direction of the sheet in FIG. 8A.

As illustrated in FIG. 8A and FIG. 8B, the magnetic head 10d includes magnetic shields 11a, 11b, a pin layer 12, an insulating layer 13a, a free layer 14, a nonmagnetic layer 15a, a free layer 14b, a nonmagnetic layer 15c, side shields SS, and insulating layers 13b, 13c.

The magnetic head 10d, as compared with the magnetic head 10, does not have the nonmagnetic layer 15b and the magnetic shield 11c. A stack 20d and a magneto-resistance effect element 30d of the magnetic head 10d are also the same in this point. As a result, in this embodiment, the stack 20d and the magneto-resistance effect element 30d are practically the same.

In this embodiment, constituent materials and film thicknesses of the magnetic shields 11a, 11b, the pin layer 12, the insulating layer 13a, the free layer 14a, the nonmagnetic layer 15a, the free layer 14b, the nonmagnetic layer 15c, the side shields SS, and the insulating layers 13b, 13c are practically the same as those of the first embodiment, and therefore a description thereof will be omitted.

However, there is a possibility that values of magnetic volumes of the free layer 14a and the free layer 14b are different from those of the first embodiment.

In this embodiment, the free layer 14b and the magnetic shield 11b are close to each other. As a result, the free layer 14b and the magnetic shield 11b are exchange-coupled (for example, nonmagnetically exchange-coupled) via the nonmagnetic layer 15c.

In this embodiment, as a cause of unbalancing of magnetization motion amounts, the following two can be thought. Specifically, they are: a) an operation due to a leakage magnetic field (bias magnetic field) applied to the free layers 14a, 14b from the side shields SS; and b) an interaction of the magnetic shield 11b and the free layer 14b. In this embodiment, b) the influence by the magnetic shield 11b is thought to be large as follows.

In this embodiment, as in the first embodiment, the influence of the side shields SS on the unbalancing of the motion amounts of the free layers 14a, 14b is opposite the influence of the magnetic shield 11b thereon. In this embodiment, a distance between the magnetic shield 11b and the free layer 14b is shorter than a distance between the side shields SS and the free layers 14a, 14b. Accordingly, the influence of the magnetic shield 11b is larger. As a result, when the magnetic volumes of the free layers 14a, 14b are equal, the motion amount of the free layer 14b becomes smaller than the motion amount of the free layer 14a.

In this embodiment, as in the first and second embodiments, the magnetic volume of the free layer 14a is preferably smaller than the magnetic volume of the free layer 14b. That is, intensity of an antiferromagnetic coupling magnetic field applied to the free layer 14a via the nonmagnetic layer 15a is made larger than intensity of an antiferromagnetic coupling magnetic field applied to the free layer 14b. Consequently, it is possible to make the free layer 14a more difficult to move than the free layer 14b, which makes it possible to solve the unbalancing of the magnetization motion amounts of the free layers 14a, 14b to suppress the base-line shift. As a result, a high SNR (Signal Noise Ratio) is obtained, enabling an increase of recording density.

As described above, in the fifth embodiment, the suppression of the base-line shift and an increase of resolution are easy, a high SNR can be obtained, and an increase of recording density is facilitated.

Sixth Embodiment

Figure 9A:
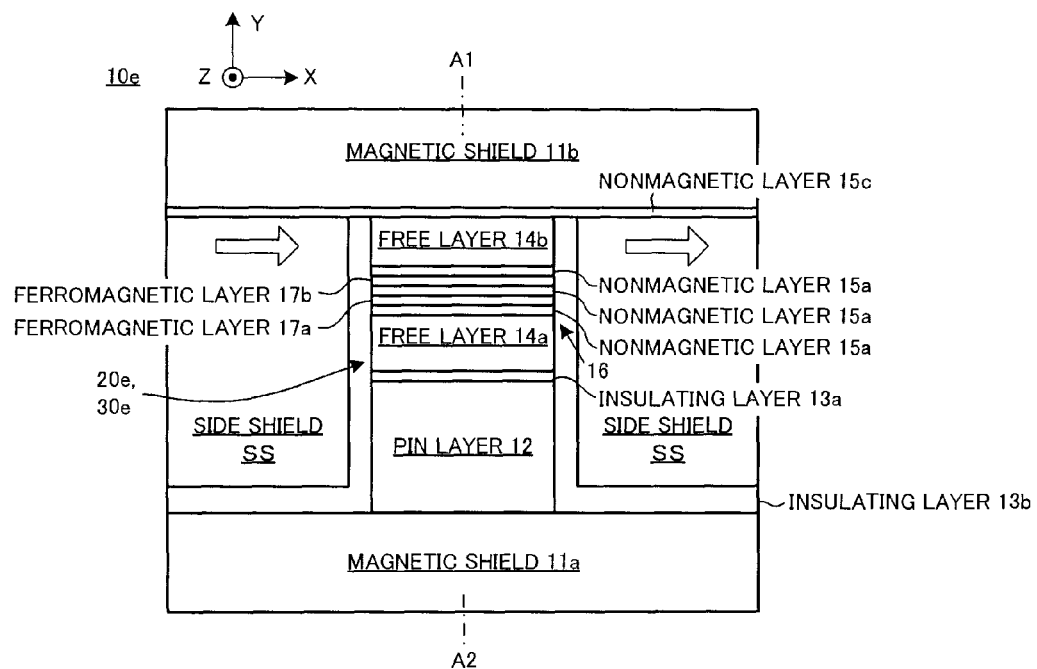
FIG. 9A and FIG. 9B are schematic views illustrating a magnetic head according to a sixth embodiment.
Figure 9B:
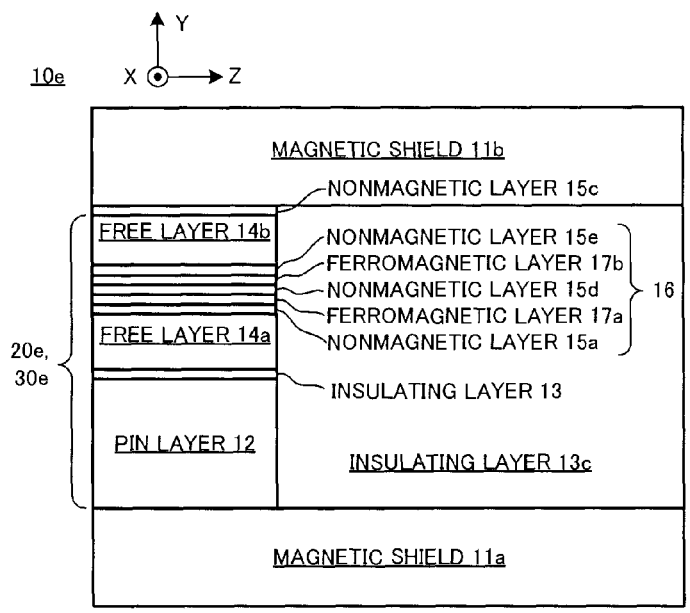

FIG. 9A and FIG. 9B are schematic views illustrating a magnetic head 10e according to a sixth embodiment. FIG. 9A is a plane view of the magnetic head 10e. FIG. 9B is a cross-sectional view taken along A1-A2 line in FIG. 9A and illustrates the magnetic head 10e in a depth direction of the sheet in FIG. 9A.

As illustrated in FIG. 9A and FIG. 9B, the magnetic head 10e includes magnetic shields 11a, 11b, a pin layer 12, an insulating layer 13a, a free layer 14a, a gap adjusting layer 16, a free layer 14b, a nonmagnetic layer 15c, side shields SS, and insulating layers 13b, 13c.

The magnetic head 10e, as compared with the magnetic head 10a, does not have the nonmagnetic layer 15b and the magnetic shield 11c. A stack 20e and a magneto-resistance effect element 30e of the magnetic head 10e are also the same in this point. As a result, in this embodiment, the stack 20e and the magneto-resistance effect element 30e are practically the same.

As material conditions (material, film thickness, shape) used in the sixth embodiment, the same ones as those in the second and filth embodiments are usable.

Causes of the occurrence of a base-line shift and its suppression principle in this embodiment are the same as those in the fifth embodiment. Specifically, in this embodiment, a magnetic volume of the free layer 14a is also preferably smaller than a magnetic volume of the free layer 14b as in the fifth embodiment. Consequently, it is possible to make the free layer 14a more difficult to move than the free layer 14b, which makes it possible to solve the unbalancing of magnetization motion amounts of the free layers 14a, 14b to suppress the base-line shift. As a result, a high SNR is obtained, enabling an increase of recording density.

As described above, in the sixth embodiment, it is possible to adjust resolution for an intended recording density. Further, the suppression of the base-line shift and an increase of resolution are easy, and a high SNR can be obtained, which facilitates an increase of recording density.

Seventh Embodiment

Figure 10:
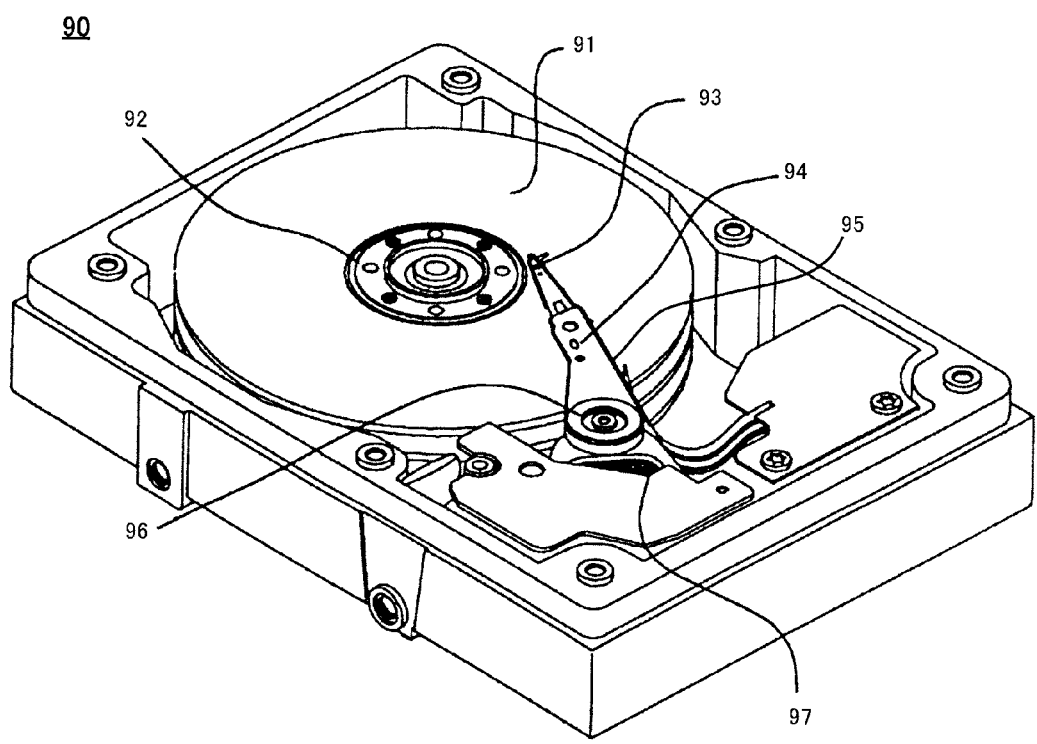
FIG. 10 is a view illustrating a magnetic recording and reproducing apparatus (HDD apparatus) according to a seventh embodiment.

FIG. 10 is a view illustrating a magnetic recording and reproducing apparatus (HDD (Hard Disk Drive) apparatus) 90 according to a seventh embodiment. The magnetic recording and reproducing apparatus 90 has the magnetic recording medium 91, a spindle motor 92, and the magnetic head 93. Information is magnetically written to and read from the magnetic recording medium 91. As the magnetic head 93, any of the magnetic heads 10 to 10e is used, and it magnetically reads information from the magnetic recording medium 91.

The magnetic recording and reproducing apparatus 90 is an apparatus of a type using a rotary actuator. The magnetic recording medium 91 is mounted on the spindle motor 92 and rotates by a motor (not illustrated) that responds to a control signal from a drive control unit (not illustrated).

When the magnetic recording medium 91 rotates, a pressing pressure by a suspension 94 and a pressure generated in a medium facing surface (also called ABS) of a head slider balance with each other. As a result, the medium facing surface (magnetic head 93) of the head slider is held with a predetermined floating amount from a surface of the magnetic recording medium 91.

The suspension 94 is connected to one end of an actuator arm 95 having a bobbin portion holding a drive coil (not illustrated), and so on. A voice coil motor 97 which is a kind of a linear motor is provided at the other end of the actuator arm 95. The voice coil motor 97 can be composed of the drive coil (not illustrated) taken up by the bobbin portion of the actuator arm 95 and a magnetic circuit composed of a permanent magnet and a counter yoke which are disposed so as to face each other to sandwich the coil.

The actuator arm 95 is held by ball bearings (not illustrated) provided at two upper and lower places of a bearing part 96 and is capable of rotationally sliding by the voice coil motor 97. As a result, it is possible to move the magnetic recording head to a desired position of the magnetic recording medium 91.

(Manufacturing Method)

A manufacturing method of the magnetic head will be described.

Figure 11:
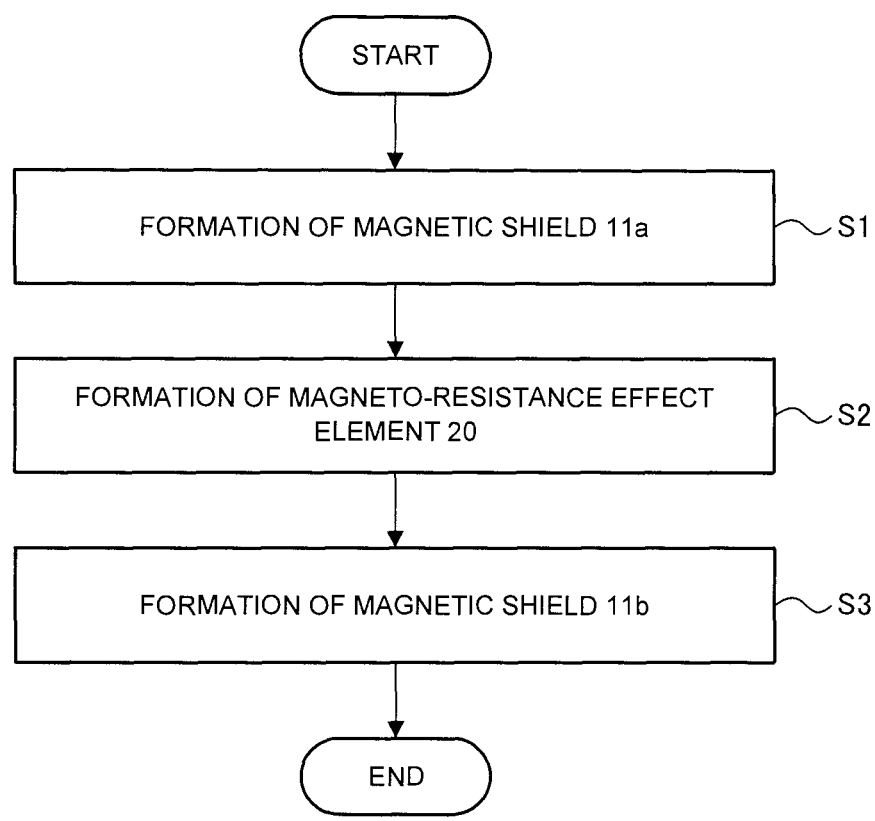
FIG. 11 to FIG. 22 are flowcharts illustrating a manufacturing procedure of the magnetic head.

FIG. 11 is a flowchart illustrating an example of the manufacturing method of the magnetic head.

FIG. 12 to FIG. 22 illustrate schematic cross-sectional views of an example of the magnetic head during the manufacture. Here, the manufacturing method of the magnetic head 10 of the first embodiment is illustrated. FIG. 12 to FIG. 17 and FIG. 22 correspond to FIG. 1A, and FIG. 18 to FIG. 21 correspond to FIG. 1B.

Figure 12:
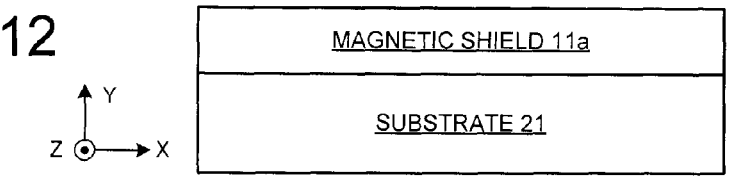

(1) Formation of Magnetic Shield 11a (Step S1, Refer to FIG. 12)

As illustrated in FIG. 12, the magnetic shield 11a is formed on a substrate 21. Details of this procedure are as follows, for instance.

a) A deposit (magnetic shield film, for example, a metal layer) being a material of the magnetic shield 11a is formed on the substrate 21 by electroplating. A constituent material of the magnetic shield film is NiFe, for instance. A Y-axis direction thickness of the magnetic shield film is 1μ, for instance.

b) A surface of the magnetic shield film is polished. Irregularities of the surface of the magnetic shield film is flattened by, for example, a chemical mechanical polishing (CMP) method.

c) Thereafter, the upper surface of the magnetic shield film is etched to remove an oxide layer and a contamination layer. The oxide layer is, for example, a layer adhering on the magnetic shield film during manufacturing processes.

Further, the upper surface of the magnetic shield film is etched. For example, the substrate 21 is carried to a chamber (not illustrated), and while a pressure in the chamber is reduced (for example, vacuumed), the upper surface of the magnetic shield film is etched by ion beams.

(2) Formation of Stack 20 (Magneto-Resistance Effect Element 30) (Step S2, Refer to FIG. 13 to FIG. 21)

Figure 13:
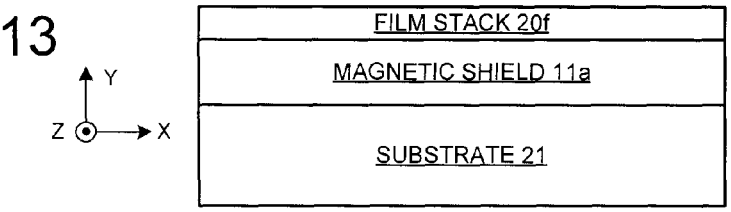

The stack 20 (magneto-resistance effect element 30) is formed on the magnetic shield 11a. Details of this procedure are as described in the following procedures a) to i), for instance.

a) A film stack 20f which will be the stack 20 (magneto-resistance effect element 30) is formed on the magnetic shield 11a by, for example, sputtering (refer to FIG. 13).

Figure 14:
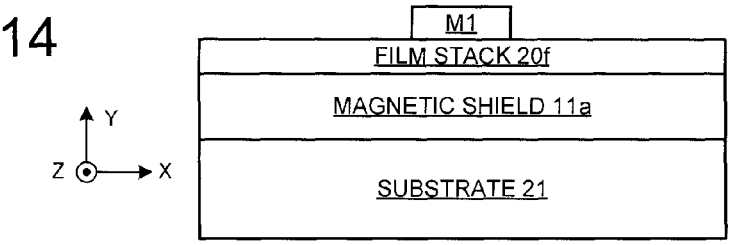

The film stack 20f includes, for example, the pin layer 12, the insulating layer 13a, the free layer 14a, the nonmagnetic layer 15a, the free layer 14b, the nonmagnetic layer 15b, and the magnetic shield 11c as illustrated in FIG. 1A and FIG. 1B. The total thickness of the film stack 20f in the Y-axis direction is 36 nm, for instance.

b) On the film stack 20f, a mask pattern M1 is formed (refer to FIG. 14).

Figure 15:
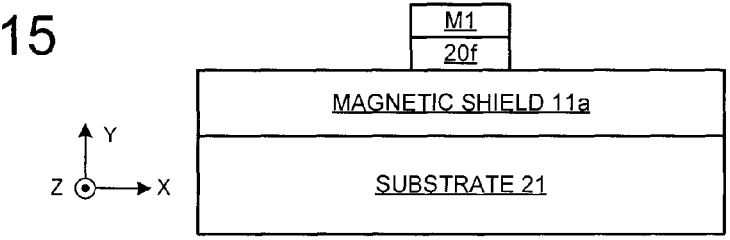
Figure 16:
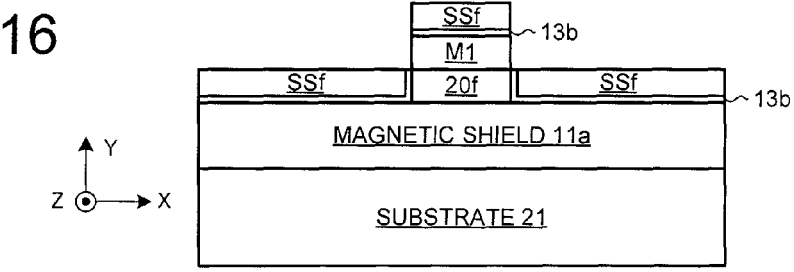

As the mask pattern M1, a resist mask or a metal mask containing Ta is used, for instance. The mask pattern M1 is formed by using, for example, a photolithography technique. A shape of an upper surface of the mask pattern M1 defines an X-axis direction width of the film stack 20f. This width is, for example, 36 nm.

c) By using the mask pattern M1 as a mask, the film stack 20f is etched by, for example, ion beam etching (refer to FIG. 15). As a result, a partial pattern of the film stack 20f is formed.

d) The insulating layer 13b and a side shield film SSf are sequentially stacked on the mask pattern M1 and the magnetic shield 11a (refer to FIG. 16). The side shield film SSf becomes the side shields SS (refer to FIG. 17).

Figure 17:
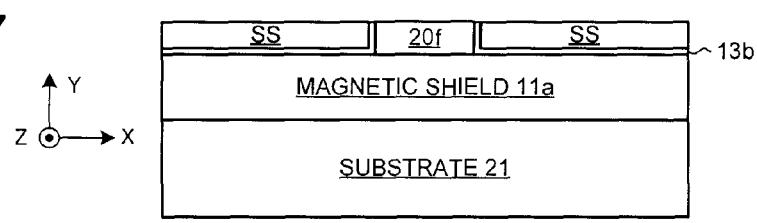

The insulating layer 13b is to prevent current passage to the side shields SS, and can be made of, for example, $Al_2O_3$. A Y-axis direction thickness of the insulating layer 13b is, for example, 3 nm. A material of the side shield film SSf is, for example, NiFe. A Y-axis direction thickness of the side shield film SSf is set so that the side shield film SSf fills etched regions, for instance.

e) The mask pattern M1, and the insulating layer 13b and the side shield film SSf on the mask pattern M1 are removed by, for example, a liftoff method (refer to FIG. 17). Thereafter, flattening by CMP (Chemical Mechanical Polishing) or the like is performed so that upper surfaces of the side shield film SSf and the film stack 20f become flush with each other. As a result, the side shields SS are formed from the side shield film SSf.

Figure 18:
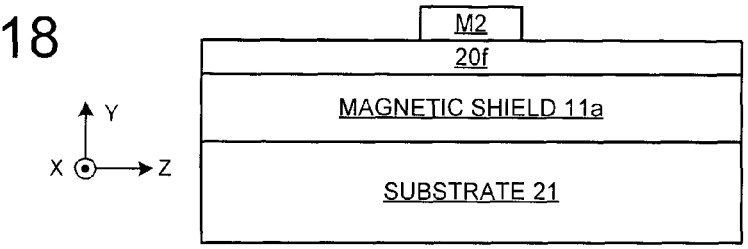
Figure 19:
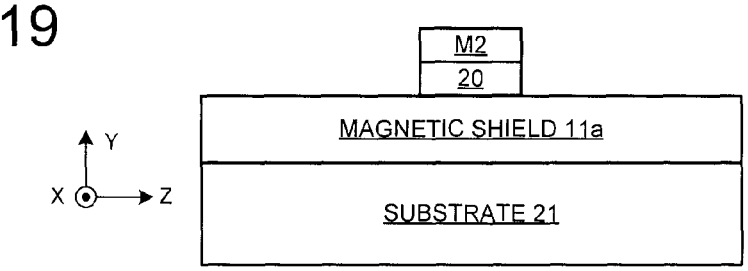
Figure 20:
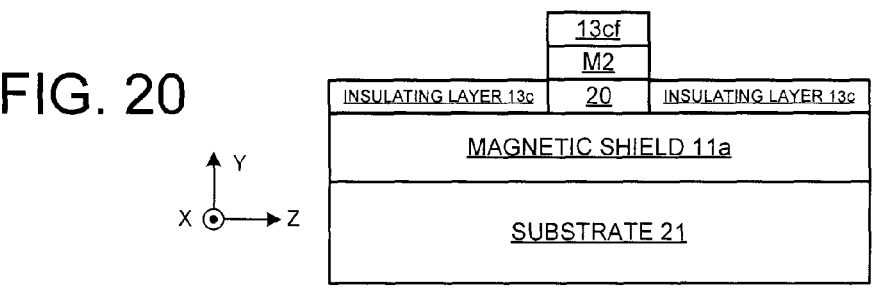
Figure 21:
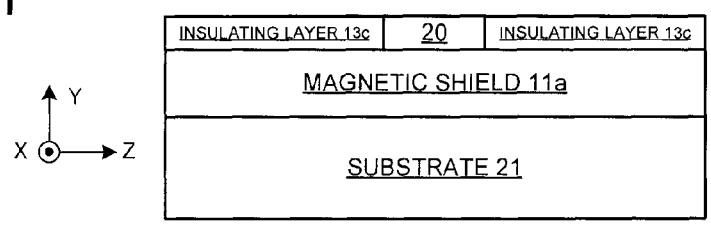

Next, the shape seen from FIG. 1B is fabricated.

f) On the film stack 20f, which will be the magneto-resistance effect element 30, that is patterned in the X-axis direction, a mask pattern M2 is stacked as in FIG. 14 (refer to FIG. 18). This is different from FIG. 14 in that an upper surface shape of the mask pattern M2 defines a width in the Z-axis direction.

g) By using the mask pattern M2 as a mask, the film stack 20f is etched by ion beams or the like to form the stack 20 (refer to FIG. 19).

h) The insulating layer 13c made of, for example, $Al_2O_3$ is stacked on the mask pattern M2 and the film of the magnetic shield 11a (refer to FIG. 20). A Y-axis direction thickness of the insulating layer 13c is set so that it fills etched regions. FIG. 20 illustrates the case where the insulating layer 13c is stacked so as to fill the etched regions.

i) The insulating layer 13c on the mask pattern M2 is removed by liftoff (refer to FIG. 21). Thereafter, flattening by CMP or the like is performed so that upper surfaces of the insulating layer 13c and the stack 20 are flush with each other.

Figure 22:
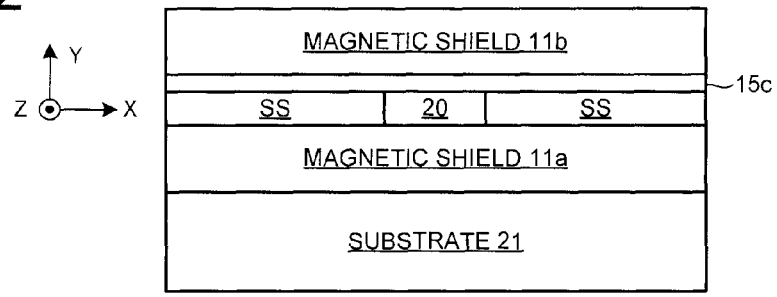
Figure 23:
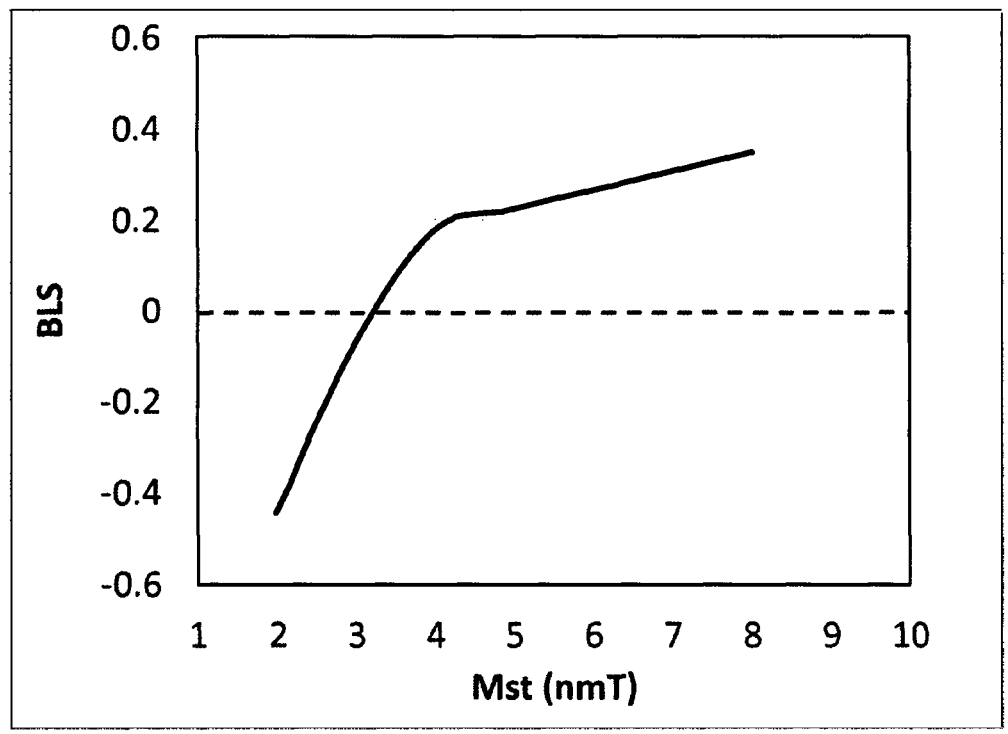
FIG. 23 to FIG. 28 are graphs illustrating examples of characteristics of the magnetic heads.
Figure 24:
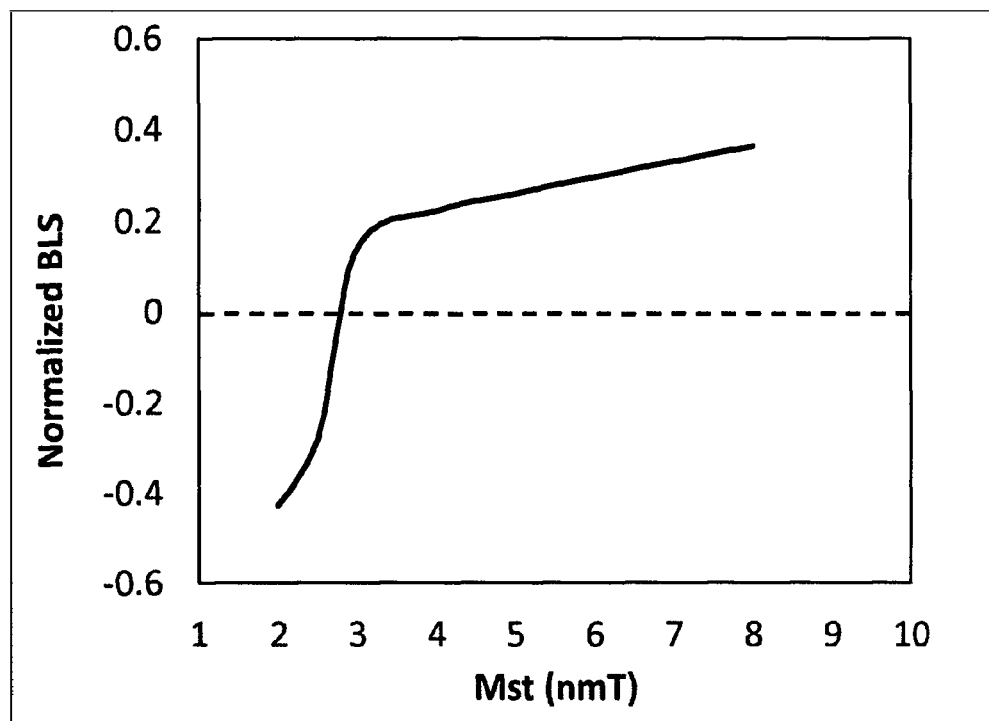

(3) Formation of Magnetic Shield 11b (Step S3, Refer to FIG. 22)

As illustrated in FIG. 22, the nonmagnetic layer 15c and the magnetic shield 11b are sequentially stacked on the stack 20 and the side shields SS by, for example, sputtering. FIG. 22 illustrates the shape when seen from FIG. 1A.

A constituent material of the magnetic shield 11b is, for example, NiFe. A Y-axis direction thickness of the magnetic shield 11b is, for example, 1 μm.

The manufacturing method of the magnetic head according to the embodiment described above is only an example and presents only the point. Actually, the manufacturing method thereafter includes a step of forming a write head and steps of cutting a wafer, forming the magnetic recording medium facing surface by polishing, and so on. Conventional manufacturing methods are applicable to these steps. A description of these conventional manufacturing methods will be omitted.

EXAMPLES

Hereinafter, examples will be described. Here, regarding examples 1 to 6 corresponding to the first to sixth embodiments respectively, dependence of the base-line shift on the magnetic volumes of the free layers 14a, 14b and SNR were found by simulations.

Examples 1 to 6

Layer structures of magnetic heads according to the examples 1 to 6 are the same as those of the first to sixth embodiments. Main layer structures of the magnetic heads according to the examples 1 to 6 are presented in Table 1 to Table 6. The size of each of free layers 14a, 14b and magnetic shields 11c of the examples 1 to 6 is 36 nm×36 nm.

Comparative Example 1

A characteristic of a magnetic head according to a comparative example 1 will be described. The magnetic head according to the comparative example 1 is the magnetic head 10x according to the first comparative example in FIG. 3A and FIG. 3B. A main layer structure of the magnetic head according to the comparative example 1 is presented in Table 7. The size of a free layer 14ax in the comparative example 1 is 36 nm and is equal to that of the free layer 14a of the example 1.

TABLE 1

| LAYER STRUCTURE | MATERIAL | FILM THICKNESS |
| --- | --- | --- |
| Pin layer 12 | Ta/NiCr/IrMn/ | 2.2 nm/2 nm/8 nm/ |
|  | CoFe/Ru/CoFe | 2.5 nm/0.4 nm/2.5 nm |
| Insulating layer 13a | MgO | 1 nm |
| Free layer 14a | CoFeB | 4 nm |
| Nonmagnetic layer 15a | Ru | 0.4 nm |
| Free layer 14b | CoFeB | 4 nm |
| Nonmagnetic layer 15b | Ru | 0.4 nm |
| Nonmagnetic layer 15c | Ru | 1 nm |
| Magnetic shield 11c | NiFe | 4 nm |
| Magnetic shield 11b | NiFe | 1 μm |
| Magnetic shield 11a | NiFe | 1 μm |
| Side shield SS | NiFe | 30 nm |

TABLE 2

| LAYER STRUCTURE | MATERIAL | FILM THICKNESS |
| --- | --- | --- |
| Pin layer 12 | Ta/NiCr/IrMn/ | 2.2 nm/2 nm/8 nm/ |
|  | CoFe/Ru/CoFe | 2.5 nm/0.4 nm/2.5 nm |
| Insulating layer 13a | MgO | 1 nm |
| Free layer 14a | CoFeB | 4 nm |
| Gap adjusting layer 16 | Ru/CoFe/ | 0.4 nm/1 nm/ |
|  | Ru/CoFe/Ru | 0.4 nm/1 nm/0.4 nm |
| Free layer 14b | CoFeB | 4 nm |
| Nonmagnetic layer 15b | Ru | 0.4 nm |
| Nonmagnetic layer 15c | Ru | 1 nm |
| Magnetic shield 11c | NiFe | 4 nm |
| Magnetic shield 11b | NiFe | 1 μm |
| Magnetic shield 11a | NiFe | 1 μm |
| Side shield SS | NiFe | 33 nm |

TABLE 3

| LAYER STRUCTURE | MATERIAL | FILM THICKNESS |
| --- | --- | --- |
| Pin layer 12 | Ta/NiCr/IrMn/ | 2.2 nm/2 nm/8 nm/ |
|  | CoFe/Ru/CoFe | 2.5 nm/0.4 nm/2.5 nm |
| Insulating layer 13a | MgO | 1 nm |
| Free layer 14a | CoFeB | 4 nm |
| Nonmagnetic layer 15a | Ru | 0.4 nm |
| Free layer 14b | CoFeB | 4 nm |
| Nonmagnetic layer 15bc | Ru | 1 nm |

TABLE 3-continued

| LAYER STRUCTURE | MATERIAL | FILM THICKNESS |
| --- | --- | --- |
| Antiferromagnetic layer 18 | IrMn | 17 μm |
| Magnetic shield 11b | NiFe | 1 μm |
| Magnetic shield 11a | NiFe | 1 μm |
| Side shield SS | NiFe | 43 nm |

TABLE 4

| LAYER STRUCTURE | MATERIAL | FILM THICKNESS |
| --- | --- | --- |
| Pin layer 12 | Ta/NiCr/IrMn/ | 2.2 nm/2 nm/7 nm/ |
|  | CoFe/Ru/CoFe | 2.4 nm/0.4 nm/2.4 nm |
| Insulating layer 13a | MgO | 1 nm |
| Free layer 14a | CoFeB | 4 nm |
| Gap adjusting layer 16 | Ru/CoFe/ | 0.4 nm/1 nm/ |
|  | Ru/CoFe/Ru | 0.4 nm/1 nm/0.4 nm |
| Free layer 14b | CoFeB | 4 nm |
| Nonmagnetic layer 15c | Ru | 1 nm |
| Antiferromagnetic layer 18 | IrMn | 15 nm |
| Magnetic shield 11b | NiFe | 1 μm |
| Magnetic shield 11a | NiFe | 1 μm |
| Side shield SS | NiFe | 45 nm |

TABLE 5

| LAYER STRUCTURE | MATERIAL | FILM THICKNESS |
| --- | --- | --- |
| Pin layer 12 | Ta/NiCr/IrMn/ | 2.2 nm/2 nm/8 nm/ |
|  | CoFe/Ru/CoFe | 2.5 nm/0.4 nm/2.5 nm |
| Insulating layer 13a | MgO | 1 nm |
| Free layer 14a | CoFeB | 4 nm |
| Nonmagnetic layer 15a | Ru | 0.4 nm |
| Free layer 14b | CoFeB | 4 nm |
| Nonmagnetic layer 15c | Ru | 1 nm |
| Magnetic shield 11b | NiFe | 1 μm |
| Magnetic shield 11a | NiFe | 1 μm |
| Side shield SS | NiFe | 26 nm |

TABLE 6

| LAYER STRUCTURE | MATERIAL | FILM THICKNESS |
| --- | --- | --- |
| Pin layer 12 | Ta/NiCr/IrMn/ | 2.2 nm/2 nm/8 nm/ |
|  | CoFe/Ru/CoFe | 2.5 nm/0.4 nm/2.5 nm |
| Insulating layer 13a | MgO | 1 nm |
| Free layer 14a | CoFeB | 4 nm |
| Gap adjusting layer 16 | Ru/CoFe/ | 0.4 nm/1 nm/ |
|  | Ru/CoFe/Ru | 0.4 nm/1 nm/0.4 nm |
| Free layer 14b | CoFeB | 4 nm |
| Nonmagnetic layer 15c | Ru | 1 nm |
| Magnetic shield 11b | NiFe | 1 μm |
| Magnetic shield 11a | NiFe | 1 μm |
| Side shield SS | NiFe | 26 nm |

TABLE 7

| LAYER STRUCTURE | MATERIAL | FILM THICKNESS |
| --- | --- | --- |
| Pin layer 12 | Ta/NiCr/IrMn/ | 2 nm/1 nm/6 nm/ |
|  | CoFe/Ru/CoFe | 2.2 nm/0.5 nm/2.2 nm |
| Insulating layer 13a | MgO | 0.8 nm |
| Free layer 14a | CoFeB | 5 nm |
| Nonmagnetic cap layer 15a | Ru | 5 nm |
| Magnetic shield 11b | NiFe | 1 μm |
| Magnetic shield 11a | NiFe | 1 μm |
| Side shield SS | NiFe | 23 nm |

(1) Dependence of Base-Line Shift on Magnetic Volume

By using the magnetic heads of the examples 1 to 6, dependence of the base-line shift on magnetic film thickness Ms×t (=Ms×V/S, S: area of the free layers 14a, 14b) of the free layers 14a, 14b was found by simulation.

Here, the area S1 of the free layer 14a and the area S2 of the free layer 14b are S1=S2=36 nm×36 nm. That is, changing the magnetic film thicknesses Ms×t of the free layers 14a, 14b is equivalent to changing the magnetic volumes of the free layers 14a, 14b.

In the simulation, models of the reproducing heads of the examples 1 to 6 were fabricated, and an isolated reproduced waveform was calculated. An amount of the base-line shift was an output in a DC magnetized state of the magnetic recording medium.

FIG. 23 to FIG. 28 illustrate how the base-line shift in the isolated waveform changes when a relation of the magnetic volumes of the free layer 14a and the free layer 14b is changed. Here, the magnetic film thickness Ms×t of the free layer 14b is fixed to 5 nmT, and the magnetic film thickness of the free layer 14a is changed. The vertical axis is normalized by an output, and the smaller its value in absolute value, the better. Preferably, Normalized BLS=0.

As illustrated in FIG. 23, FIG. 24, FIG. 27, and FIG. 28, in the examples 1, 2, 5, 6, it is seen that a condition enabling the suppression of the base-line shift exists where the magnetic film thickness (magnetic volume) of the free layer 14a is smaller than the magnetic film thickness (magnetic volume) of the free layer 14b.

Figure 25:
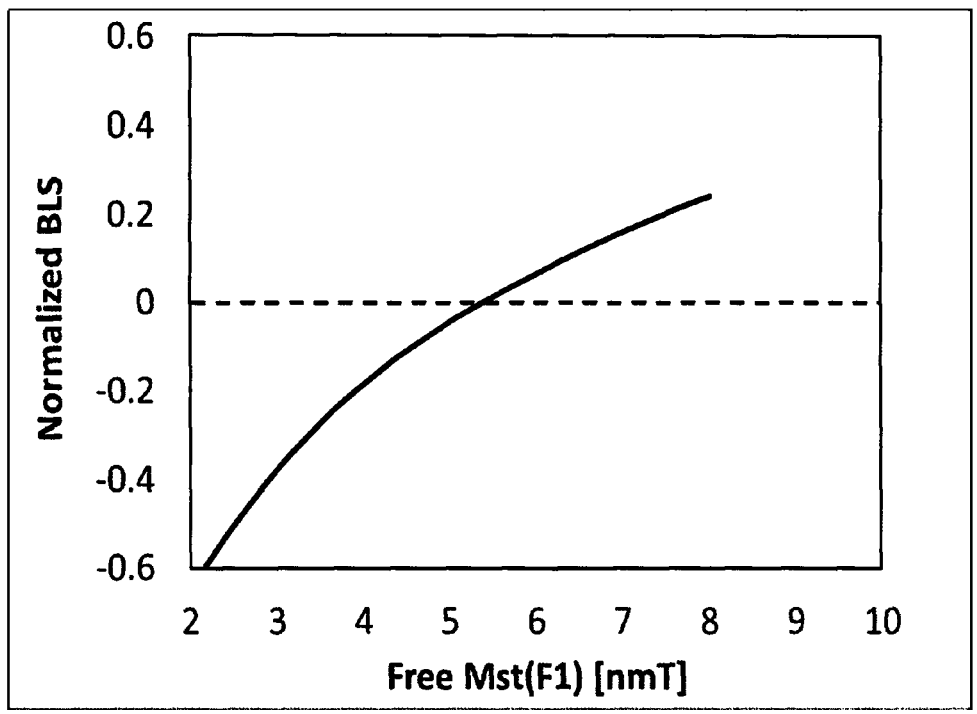
Figure 26:
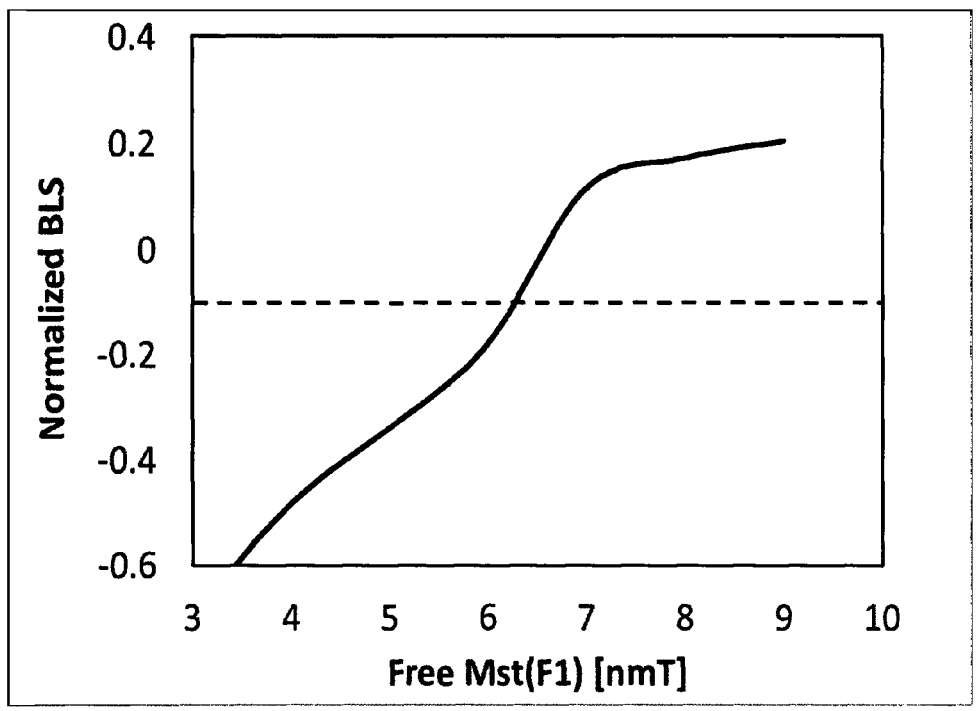
Figure 27:
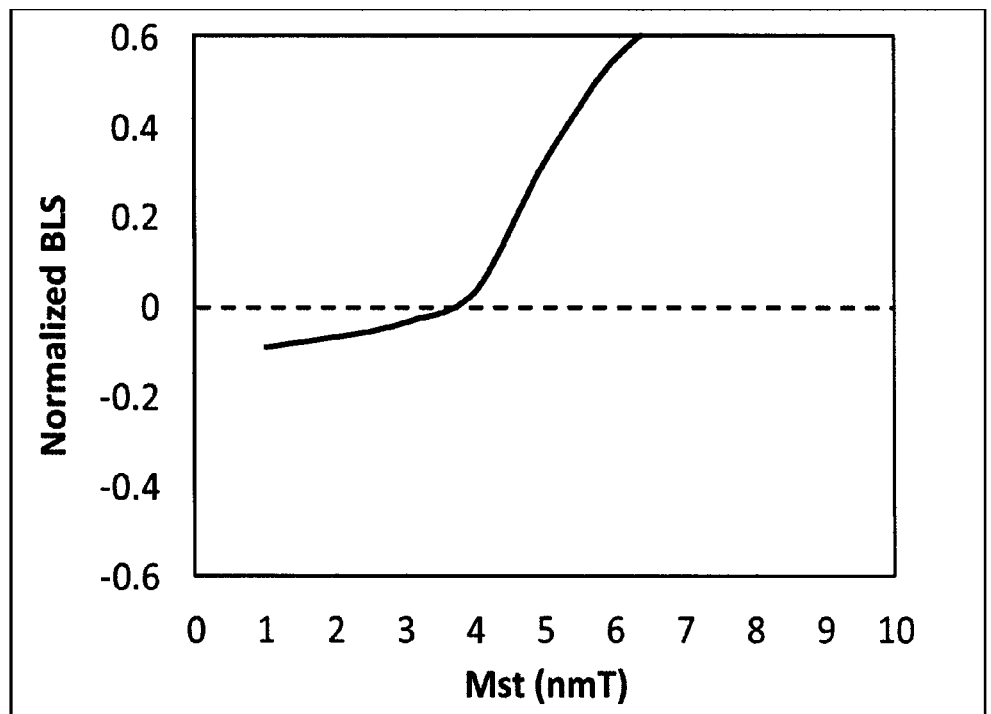
Figure 28:
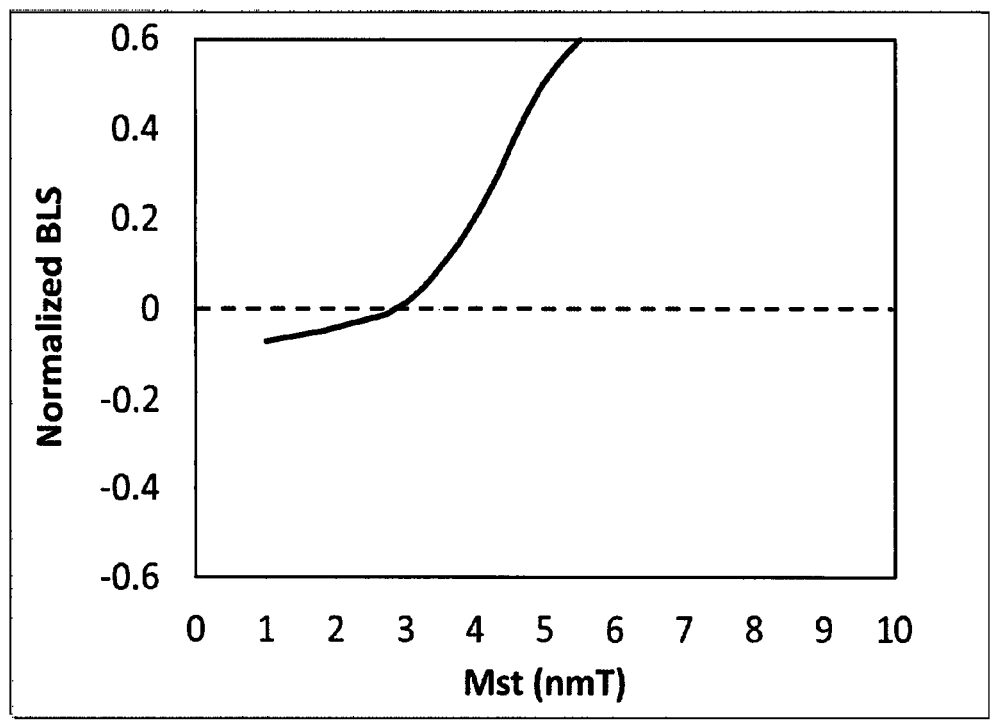

On the other hand, as illustrated in FIG. 25 and FIG. 26, in the examples 3, 4, it is seen that a condition enabling the suppression of the base-line shift exists where the magnetic film thickness (magnetic volume) of the free layer Ma is larger than the magnetic film thickness (magnetic volume) of the free layer 14b.

(2) SNR

SNR was found by simulation. A reproduced waveform in a magnetic recording magnetization pattern of 1000 kfci was calculated, and SNR was calculated from a signal frequency component and a noise component when the obtained reproduced waveform was frequency-resolved. A cutoff frequency at the time of the calculation of the noise component was 1 GHz.

As the magnetic film thickness of the magnetic head used in the SNR calculation, the conditions enabling the suppression of the base-line shift were used. That is, the conditions of the examples 1 to 6 were set as follows respectively.

Example 1: Ms×t of the free layer 14a=3.2 nmT, Ms×t of the free layer 14b=5 nmT
Example 2: Ms×t of the free layer 14a=2.8 nmT, Ms×t of the free layer 14b=5 nmT
Example 3: Ms×t of the free layer 14a=5 nmT, Ms of the free layer 14b×t=5.5 nmT
Example 4: Ms×t of the free layer 14a=5 nmT, Ms×t of the free layer 14b=6.4 nmT
Example 5: Ms×t of the free layer 14a=3.8 nmT, Ms×t of the free layer 14b=5 nmT
Example 6: Ms×t of the free layer 14a=2.9 nmT, Ms×t of the free layer 14b=5 nmT Table 8 presents results of SNR of the examples 1 to 6 and the comparative example 1.

TABLE 8

| | SNR[dB] |
|---|---|
| Example 1 | 13.5 |
| Example 2 | 13.3 |
| Example 3 | 13.7 |
| Example 4 | 13.6 |
| Example 5 | 13.0 |
| Example 6 | 12.9 |
| Comparative Example 1 | 10.5 |

As is seen in Table 8, for the magnetic recording pattern of the same recording density, the SNR values in all the examples 1 to 6 are higher than that of the comparative example 1. That is, it is seen that the reproducing head structures of the examples 1 to 6 achieve higher resolution than that of the reproducing head of the comparative example 1, and facilitate an increase of recording density.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head comprising:
   a stack;
   a pair of side shields facing side surfaces of the stack; and
   a first and a second magnetic shield sandwiching the stack and the side shields, the stack including:
      a pin layer disposed on the first magnetic shield and having a magnetization direction being fixed;
      an insulating layer disposed on the pin layer;
      a first free layer disposed on the insulating layer and having a magnetization direction configured to change in accordance with an external magnetic field;
      a second free layer disposed on the first free layer and being antiferromagnetically exchange-coupled with the first free layer and having a magnetization direction configured to change in accordance with the external magnetic field;
      a nonmagnetic layer disposed on the second free layer; and
      a third magnetic shield disposed on the nonmagnetic layer and being exchange-coupled with the second free layer via the nonmagnetic layer,
   a magnetic volume of the first free layer being smaller than a magnetic volume of the second free layer.

2. The magnetic head of claim 1,
   wherein the side shields are disposed in correspondence to end surfaces of the first and second free layers, and
   wherein the magnetic field from the side shields is applied to the first and second free layers.

3. The magnetic head of claim 1,
   wherein the stack further includes a second nonmagnetic layer disposed between the first and second free layers, and
   wherein the first and second free layers are antiferromagnetically exchange-coupled via the second nonmagnetic layer.

4. The magnetic head of claim 1,
   wherein the stack further includes a gap adjusting layer disposed between the first and second free layers, the gap adjusting layer including a nonmagnetic layer and a magnetic layer alternately stacked, and wherein the first and second free layers are antiferromagnetically exchange-coupled via the gap adjusting layer.

5. The magnetic head of claim 1, wherein the magnetic head outputs a signal corresponding to a difference between the magnetization directions of the first and second free layers.

* * * * *